United States Patent
Ortega et al.

(10) Patent No.: US 9,944,539 B2
(45) Date of Patent: Apr. 17, 2018

(54) FABRICS FOR OIL SHEEN REMOVAL AND ITEMS MADE THEREFROM

(71) Applicant: Cerex Advanced Fabrics, Inc., Cantonment, FL (US)

(72) Inventors: Albert E. Ortega, Pensacola, FL (US); Erin Sutton Carter, Pensacola, FL (US); Daniel Baillie, Pensacola, FL (US)

(73) Assignee: Cerex Advanced Fabrics, Inc., Cantonment, FL (US)

(*) Notice: Subject to any disclaimer, the term of this patent is extended or adjusted under 35 U.S.C. 154(b) by 167 days.

(21) Appl. No.: 14/857,448

(22) Filed: Sep. 17, 2015

(65) Prior Publication Data

US 2016/0083269 A1  Mar. 24, 2016

Related U.S. Application Data

(60) Provisional application No. 62/052,271, filed on Sep. 18, 2014, provisional application No. 62/065,377, filed on Oct. 17, 2014, provisional application No. 62/065,398, filed on Oct. 17, 2014.

(51) Int. Cl.

| | |
|---|---|
| *B01D 24/00* | (2006.01) |
| *B01D 39/00* | (2006.01) |
| *B01D 39/14* | (2006.01) |
| *E02B 15/00* | (2006.01) |
| *C02F 1/28* | (2006.01) |
| *B01D 17/02* | (2006.01) |
| *D04H 3/16* | (2006.01) |
| *D04H 3/009* | (2012.01) |
| *C02F 101/32* | (2006.01) |

(52) U.S. Cl.
CPC .......... *C02F 1/285* (2013.01); *B01D 17/0202* (2013.01); *D04H 3/009* (2013.01); *D04H 3/16* (2013.01); *C02F 2101/32* (2013.01)

(58) Field of Classification Search
None
See application file for complete search history.

(56) References Cited

U.S. PATENT DOCUMENTS

| | | | |
|---|---|---|---|
| 3,516,900 A | 6/1970 | Mallonee et al. | |
| 3,701,258 A * | 10/1972 | Rhodes | E02B 15/102 210/242.1 |
| 3,978,185 A | 8/1976 | Buntin | |
| 4,041,203 A | 8/1977 | Brock et al. | |
| 4,100,324 A * | 7/1978 | Anderson | C11D 17/049 156/167 |
| 4,168,195 A | 9/1979 | Anderson et al. | |
| 5,108,224 A | 4/1992 | Cabaniss et al. | |
| 5,391,415 A | 2/1995 | Bair | |
| 6,422,787 B1 | 7/2002 | Mikell | |
| 7,465,129 B2 | 12/2008 | Singleton | |
| RE42,695 E | 9/2011 | Singleton | |
| 8,882,399 B2 | 11/2014 | Ortega | |
| 2001/0052162 A1 * | 12/2001 | Young | A47L 13/20 15/229.2 |
| 2004/0076482 A1 | 4/2004 | Singleton | |
| 2008/0164221 A1 * | 7/2008 | Brownstein | B01D 15/00 210/767 |
| 2011/0284450 A1 * | 11/2011 | Chadwick | C02F 1/285 210/242.4 |
| 2014/0072375 A1 | 3/2014 | Ortega | |
| 2015/0003920 A1 | 1/2015 | Ortega | |
| 2015/0047298 A1 * | 2/2015 | Szebalskie, Sr. | E02D 29/0291 53/410 |

FOREIGN PATENT DOCUMENTS

| | | |
|---|---|---|
| EP | 1367152 A1 | 12/2003 |
| WO | WO 2010/059246 A2 | 5/2010 |

OTHER PUBLICATIONS

Jena et al., Advances in Pore Structure Evaluation by Porometry, Chemical Engineering & Technology Journal, vol. 33, Issue 8, pp. 1241-1250 Aug. 2010.
Wolfe et al., Qualitative Valuation of Performance Testing for Sediment Retention Devices, International Erosion Control Association, http://www.ieca.org/membersonly/cms/content/Proceedings/Object463PDF English.pdf.
Cerex Advanced Fabrics, L.P., United States Trademark 2,163,116.

* cited by examiner

*Primary Examiner* — Ana Fortuna
(74) *Attorney, Agent, or Firm* — Saliwanchik, Lloyd & Eisenschenk

(57) ABSTRACT

Strong fabrics are provided that can be used for items that can be moved or gathered while maintaining their integrity. The added strength of the fabric and the performance of the fabric make these fabrics and these items more effective in responding to oil spills. These fabrics and items will remove oil sheen from the surface of water and can absorb more than their dry weight in oil from water. Non-linting socks (e.g., sediment socks or absorbent socks) are also provided.

20 Claims, No Drawings

FABRICS FOR OIL SHEEN REMOVAL AND ITEMS MADE THEREFROM

CROSS-REFERENCE TO A RELATED APPLICATION

This application claims the benefit of U.S. provisional application Ser. No. 62/052,271, filed Sep. 18, 2014, U.S. provisional application Ser. No. 62/065,377, filed Oct. 17, 2014, and U.S. provisional application Ser. No. 62/065,398, filed Oct. 17, 2014, each of which is incorporated herein by reference in its entirety.

BACKGROUND

Pads and sweeps made from polypropylene melt blown fabrics are commonly used by first responders to absorb spilled oil. These fabrics have little strength and tend to fall apart after absorbing oil when deployed in the field. One example of a melt blown fabric used for this purpose has a basis weight of about 5.49 ounces per square yard (osy) as measured by American Society for Testing and Materials test method (ASTM) D3776, a grab breaking strength in the machine direction of about 8.1 pounds force ($lb_f$) as measured by ASTM D5034, a grab elongation in the machine direction of about 9% as measured by ASTM D5034, a grab breaking strength in the cross direction of about 9.5 $lb_f$ as measured by ASTM D5034, a grab elongation in the cross direction of about 43.3% as measured by ASTM D5034, a burst strength of about 15.8 lb/in$^2$ as measured by ASTM D3786, a thickness of about 0.078 mils as measured by ASTM D1777, and an air permeability of about 53.4 cubic feet per minute per square foot (ft$^3$/min/ft$^2$) as measured by ASTM D737.

Polypropylene is often used since it is available at a relatively low cost. The fabrics are commonly made into items such as pads and sweeps. Sweeps are fabrics with a seamed edge and a rope or band attached to at least one edge. The sweeps are then passed on the surface of the water to capture and remove spilled crude oil from the environment. These items lose integrity when deployed and exposed to oil, making it difficult to gather and collect them after they have absorbed oil. They also will easily break or disintegrate since they have such low strength when pulled or dragged in the field, creating difficulties when crews are cleaning up oil spills. When using polypropylene fabrics to fabricate sweeps, a band is typically added to one or more longitudinal edges and vertical edges to give the sweep more strength for pulling or dragging and to prevent disintegration when the sweep becomes wet with oil. This adds cost and adds at least one additional fabrication step. In addition, items made from these polypropylene fabrics do not remove oil sheen on the surface of water. A 100 foot roll of sweep made using this fabric has a diameter of about 16 to 17 inches when rolled up.

A typical remediation plan to address an oil spill involves the deployment of booms to contain the spilled oil and pads to absorb the spilled oil or mechanical means such as skimmers or vacuum pump trucks to collect the spilled oil. Often, mops, pom poms, or snares made from split film polyethylene material are used to collect the spilled crude oil. The polyethylene split film material is not effective in absorbing lower viscosity fluids and performs best on very thick material such as weathered crude oil in the viscosity range of about 150,000 centistokes or higher. For a common comparison, this viscosity is similar to tomato paste or peanut butter. Crude oil has a viscosity of about 1 to 5 centistokes. Commercially available snares are made by tying 30 pom poms on 50 feet of rope. These pom poms weigh about 1 pound each. First responders will deploy these snares early during a spill to no avail in removing crude oil from the environment. A pom pom made from this slit film polyethylene material absorbs about 1.87 times its own dry weight of crude oil.

Sweeps are also used to absorb oil and frequently used in an unsuccessful attempt to remove oil sheen. Sweeps are made from polypropylene fabrics similar to the fabric used for absorbent pads. They are commercially available in 100 foot rolls that are about 19 inches wide. Since the polypropylene material is so thick, the 100 foot roll of sweep tends to be bulky and hard to handle.

In addition, spills of liquids happen in industry and in the transporting of chemicals. Several methods are currently used to remove spilled materials from the environment including the use of absorbent pads and other absorbent articles. Accidental spills of petroleum products can have profound, far reaching environmental effects, especially if the spilled material is dispersed in water as an oil in water emulsion. First responders to spills of oil or other liquids in the environment will initially try to contain the oil then remove it from the environment. Removal methods include but are not limited to skimming liquids off the surfaces of water, absorbing the liquids on pads, snares, mops and other absorbent articles and pressure washing surfaces then collecting the runoff for disposal. Examples of absorbent pads are described in many patents. For example, pads made from melt blown polypropylene or spunbond polypropylene or both are well known in the art.

Several commercially available absorbent pads and articles currently used are made of melt blown fabrics. While these fabrics absorb several times their dry weight in oil they tend to not maintain their integrity after they have been deployed and have absorbed liquids. They are typically in the basis weight range of about 6 to 10 ounces per square yard (osy) and do not have near the strength per basis weight of spunbond fabrics after they have become wet with oil. They tend to be heavy and dense.

The process of extruding and forming thin fibers of polypropylene and other thermoplastics, generally called "melt blowing" is well known and described in U.S. Pat. No. 3,978,185 to Buntin et al. and U.S. Pat. No. 4,100,324 to Anderson et al. Multiple plies of melt blown sheets and combinations of melt blown sheets and spunbond polypropylene sheets combined by ultrasonically welding the plies together at a number of points uniformly across the length and width are also commercially available. These sheets are then processed into rolls, pads, and wipes for uses such as cleaning an oil spill on a factory floor, wiping off oily machinery, skimming oil off of the surface of a body of water, and for a variety of other applications where the user desires to collect hydrocarbons or other liquids. These pads require some method of bonding to increase the strength and integrity or else the melt blown fibers disassociate when pulled or when the pad becomes soiled with oil. U.S. Pat. No. 4,041,203 to Brock discloses a nonwoven material in the form of a laminate having an integrated mat of generally discontinuous thermoplastic fibers as a layer and a web of substantially continuous and randomly deposited filaments of a thermoplastic polymer as another layer. The mat and web are attached at intermittent discrete bond regions by passing the material through a calendaring system. Similarly, when a layer of melt blown fabric is sandwiched between two spunbond layers this is commonly referred to as a spunbond-melt blown-spunbond fabric or SMS fabric. Pads are also made from these fabrics.

U.S. Pat. No. 5,391,415 describes an absorbing article with twelve to twenty-four ounces per square yards (osy) of balls of fluff formed from out-of-planed crimped fibers with an outer porous fabric in the range of 3-5.1 osy that is combined with lanes that are no more than 0.4 cm wide forming 1-4 cm channels between successive lanes. This article will absorb at least about 6 times its dry weight of A-520 hydraulic oil. Narrow channels as described in this patent require a large amount of stitching and also reduce the thickness and increase the density around the stitched area. This reduces the amount of oil that can be absorbed by the mass near and in the stitching. An article with the minimum number of seams required to provide the strength to prevent ripping or tearing and to provide integrity when wet with oil or water or both provides an advantage by increasing the oil absorbing capability of the material and minimizing the cost to make the article because less sewing thread is used. It is also an advantage to have an article with a low basis weight and the ability to absorb many times its dry weight in oil.

Other materials such as cellulose are often used to make absorbent articles. None of the materials or articles in the prior art are effective in removing oil sheen.

Hay bales are used to prevent soil erosion, control water flow, and sediment flow on road sides, in culverts and ditches, on construction locations and other sites. Hay bales have several disadvantages including but not limited to biodegradability and supply issues due to climate conditions such as drought and consistency of quality. U.S. Pat. No. 6,422,787 to Mikell discloses a synthetic bale made from ground carpet fibers that have been needle punched into a mat and rolled into a bale. This bale is then covered with netting made from a mesh material. Carpet fibers made using this technique are released in the environment when the synthetic bale is deployed.

BRIEF SUMMARY OF THE INVENTION

Embodiments of the subject invention provide strong, lightweight fabrics used to protect the environment when hydrocarbons such as crude oil are accidentally released. Embodiments also include containment systems and/or clean-up systems using such fabrics. These fabrics can be used to make items that can effectively contain, absorb, collect, and/or remove spilled hydrocarbons and other organic compounds such as crude oil from the environment. Items made from these fabrics include pom poms, pads, mops, snares, and sweeps.

The strong fabrics can be used by, or can be used to fabricate items that can be used by, first responders to gather and remove spilled hydrocarbons and other organic compounds such as crude oil from the environment. These items can be, for example, pulled, dragged, moved, or gathered while maintaining their integrity after they have absorbed oil. The added strength of the fabric, the ability of the fabrics to contain or separate oil from water, the ability of the fabrics to remove oil sheen from the surface of the water, and the absorbency performance of the fabrics make the fabrics and items made from them more effective in responding to oil spills.

The strong fabrics provide sufficient tensile strength and integrity to remain intact when items, products, or devices made from them are deployed and then gathered after spilled hydrocarbons and other organic compounds such as crude oil are collected and removed from the environment by these fabrics or items, products, or devices including the fabrics.

The items made from these fabrics include oil absorbent items including but not limited to pom poms, mops, snares, sweeps, pillows, booms, and socks.

Strong fabrics of the subject invention, which can be made into mops, pom poms, or snares that absorb oil, provide benefits over the related art. There is a need in the art to have a pom pom, mop, or snare that will absorb more than 1.9 times its dry weight in oil and that will remove oil sheen from the surface of water.

Fabrics that absorb oil from water while retaining more strength and integrity after being exposed to oil and/or water provide benefits over the related art. There is also a need for a fabric or article that removes oil sheen from the surface of water. Oil sheen on water is defined as oil on top of water that settles as a thin film layer that causes the thin layer to shimmer because of an optical phenomenon called interference. The shimmering can be in different colors. There is a need in the art for a sweep that will remove oil sheen from the surface of water and that is not large in diameter when fabricated into a 100 foot roll.

The subject invention also relates to articles comprised of layers of fabrics that can absorb oil or other materials spilled on the ground or in bodies of water such as swamps, rivers, streams, lakes, bays, ponds, wetlands, gulfs and oceans. These fabrics absorb oil or other materials from water and maintain their integrity when exposed to sunlight, water, and most spilled materials. Various articles can be made from these fabrics to deploy them to absorb oil. These articles are lighter than articles made with materials of the related art and will maintain their integrity after the spilled fluid has been absorbed and while they are being recovered for disposal. Fabrics can be selected as specific layers to make these articles such that they remove oil sheen. Inner layers can be combined with outer layers to give enhanced absorbency. Recycled materials can also be used to make these articles.

There is a need in the art for a lighter weight fabric that retains its integrity after absorbing many times its dry weight of liquids such as oil and other environmental contaminants when removing these materials from the environment. It is also advantageous to provide an article that will absorb more oil per unit mass of dry weight than commercially available pads made of melt blown fabrics. There is also a need to provide articles that maintain their integrity after absorbing spilled liquids when pulled or stressed so that they can be deployed, recovered and removed from the environment for proper disposal or reuse. It is advantageous to provide an article that allows the oil to be recovered and then reused to absorb more oil. It is also advantageous to provide an article that is made from recycled material.

Pads made from melt blown fabrics or a combination of melt blown fabrics and spunbond fabrics will typically absorb about 8 to about 14.3 times their dry weight in oil that has a viscosity of about 320 centistokes. It is advantageous to have an article or pad that will maintain its integrity when wet with oil or water or both and absorb more than 14.3 times its dry weight in oil. There is a need in the art to provide an article that will absorb more oil per unit mass of dry weight than commercially available pads made of spunbond or melt blown fabrics or a combination of both. There is also a need to have a fabric or article that will remove oil sheen on top of water.

The subject invention provides articles comprised of layers of several fabrics that are used to absorb oil and other liquids. Outer layers of these articles can be made from fabrics that remove oil sheen. Batting, meltblown or other lower density or super absorbent material can be used as inner layers to increase the absorbency performance of the articles. These articles are used to remove spilled materials from the environment and oil sheen from the top of water.

Embodiments of the subject invention relate to articles used to absorb spilled oil and other materials from roadways, shorelines, ground and bodies of water such as rivers, streams, lakes, bays, ponds, wetlands, swamps, gulfs and oceans. In several embodiments, layers of fabric are combined to make two or more plies of absorbent material to efficiently remove oil from water. Layers of fabric can also be combined with other absorbent material such as polyester batting, bicomponent polyester batting or polypropylene batting or bicomponent meltblown fabric made with nylon, polyester or polypropylene filaments. In a specific embodiment, batting is combined by sewing it between two layers of spunbond fabric to make an article that absorbs about 40 times its dry weight of oil with a viscosity of 320 centistokes as compared to typical melt blown and spunbond-melt blown laminates that absorb about 7 to 14 times their dry weight of oil with a viscosity of 320 centistokes. The outer fabric layers can be both oleophilic and hydrophilic enhancing the motive force to draw oil to the article when it is in a water and oil emulsion. These articles will remove sheen on top of water because the spunbond fabric will absorb small concentrations of oil present in water.

In addition, embodiments of the subject invention provide articles, such as sediment socks and/or absorbent socks, that can be made with fabrics that do not allow the inner material to migrate into the environment. Fabrics used for the outer portion of a sediment sock can be selected with good permeability to allow acceptable water flow through the outer layer of the sediment sock while preventing sediment from flowing past the sock. Fabrics can also be selected that will absorb oil, removing pollutants from the environment. These sediment socks are useful to prevent soil erosion in a multitude of applications and situations.

There is a need in the art for a synthetic bale that is readily supplied regardless of climate conditions, that is consistent in quality and supply and that does not lint or release fibers into the environment. Embodiments of the subject invention can meet such a need.

DETAILED DISCLOSURE OF THE INVENTION

In the following detailed description, specific terms and examples are used in describing the invention; however, unless indicated otherwise, these are used for demonstrative purposes and should not be construed as limiting. It will be apparent to the skilled artisan having the benefit of the instant disclosure that the invention is susceptible to numerous variations and modifications within its spirit and scope. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

Strong fabrics that absorb oil (e.g., from water) can be used to recover and remove spilled hydrocarbons and other organic compounds such as crude oil from the environment; such fabrics can also be used to fabricate items or devices that are used to recover and remove spilled hydrocarbons and other organic compounds such as crude oil from the environment.

Fabrics according to the subject invention, as well as items made from such fabrics, can remove sheen (e.g., oil sheen) from water. Oil sheen on water is defined as oil on top of water that settles as a thin film layer that shimmers because of an optical phenomenon called interference. The shimmering can be in different colors. Sheen in general is when a substance is on top of water and settles as a thin film layer that shimmers because of interference. The shimmering can be in different colors. Fabrics of the subject invention surprisingly remove sheen from water, including removing oil sheen from an oil and water mixture. Such fabrics can include nylon, polyester, polyethylene, polypropylene, or any combination thereof, though embodiments are not limited thereto. Such fabrics can be spunbond fabrics, though embodiments are not limited thereto. For example, a fabric that removes sheen from water of an oil and water mixture can be a nylon spunbond fabric, a polyester spunbond fabric, or a polypropylene spunbond fabric, or a spunbond fabric made from a combination of at least two of nylon, polyester, and polypropylene.

A sweep according to the subject invention can include a fabric as described herein, that can remove sheen, including oil sheen, from water, and such a sweep can be small in diameter (e.g., less than 10 inches, less than 9 inches, or less than 8.5 inches) when fabricated into a 100 foot roll.

In one embodiment, a strong nonwoven fabric made of a single layer can be used to fabricate items that can capture and remove spilled oil from the environment. These items include but are not limited to pom poms, mops, snares, and sweeps. A nonwoven fabric used to fabricate items that can capture and remove spilled oil from the environment can have a basis weight of, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in ounces per square yard (osy)): 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5, 5.5, 6, 6.5, 7, 7.5, 8, 8.5, 9, 9.5, 10, 11, 12, 13, 14, 15, 16, 17, 18, 19, 20, 25, 30, 35, 40, 45, or 50. For example, a nonwoven fabric can have a basis weight of 0.3 osy, 0.4 osy, 0.5 osy, 0.6 osy, 0.7 osy, 0.85 osy, 1 osy, 2 osy, 3 osy, 3.1 osy, 4 osy, about 0.3 osy, about 0.4 osy, about 0.5 osy, about 0.6 osy, about 0.7 osy, about 0.85 osy, about 1 osy, about 2 osy, about 3 osy, about 3.1 osy, or about 4 osy. In particular embodiments, a nonwoven fabric can have a basis weight of no more than 4 osy, no more than 3.1 osy, no more than 3 osy, no more than 0.85 osy, no more than 0.7 osy, no more than 0.5 osy, no more than 0.4 osy or no more than 0.3 osy. In other embodiments, a nonwoven fabric can have a basis weight of at least 4 osy, at least 3.1 osy, at least 3 osy, at least 2 osy, at least 1 osy, at least 0.85 osy, at least 0.7 osy, at least 0.6 osy, at least 0.5 osy, at least 0.4 osy or at least 0.3 osy.

A nonwoven fabric used to fabricate items that can capture and remove spilled oil from the environment can have a machine direction grab tensile strength, as measured using ASTM D5034, of, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in pounds force ($lb_f$): 1, 2, 3, 4, 5, 6, 7, 8, 9, 10, 11, 12, 13, 14, 15, 16, 17, 18, 19, 19.6, 20, 20.8, 21, 21.1, 21.8, 21.9, 22, 22.45, 23, 24, 25, 26, 27, 28, 29, 30, 35, 40, 45, 50, 55, 60, 65, 70, 75, 80, 85, 90, 95, 100, 105, 110, 115, 120, 125, 130, 132, 135, 140, 145, 150, 155, 157, 160, 165, 170, 175, 180, 185, 190, 195, 200, 225, 250, 275, 300, 350, 400, 450, 500, 550, 600, 650, 700, 750, 800, 850, 900, 950, 1000, 1100, 1200, 1300, 1400, 1500, or 2000. For example, a nonwoven fabric can have a machine direction grab tensile strength, as measured using ASTM D5034, of about 1 $lb_f$, about 2 $lb_f$, or about 3 $lb_f$. In particular embodiments, a nonwoven fabric can have a machine direction grab tensile strength, as measured using ASTM D5034, of at least 3.6 $lb_f$, at least 12 $lb_f$, at least 15.5 $lb_f$, at least 70 $lb_f$, or at least 73 $lb_f$. In a preferred embodiment a fabric has a basis weight of about 0.5 osy as measured by ASTM test method D3776, thickness of about 5.9 mils as measured using ASTM D1777, machine direction grab tensile strength of at least about 12 $lb_f$ as measured using ASTM D5034, machine direction grab elongation of about 60% as measured using ASTM D5034, cross direction grab tensile strength of at least about 7.6 $lb_f$ as measured using ASTM D5034, cross direction grab elongation of about 63% as measured using ASTM D5034, machine direction trapezoidal tear strength of at least about 4.4 $lb_f$ as measured by ASTM D5587, cross direction trapezoidal tear strength of at least about 2.8 $lb_f$ measured by ASTM D5587, a burst strength of at least about 13 $lb/in^2$ as measured by ASTM D3786, a mean pore size of about 120 microns, air permeability of about 1516 $ft^3/min/ft^2$ as measured by ASTM D737, continuous nylon filaments, and wicks oil and water.

A fabric of the subject invention can pass the criteria for SW-846, Third Edition which is the EPA standard for allowing wastes to be treated as non-hazardous waste. As is understood in the art, stating that a fabric will pass the criteria for SW-846 means that, following testing per the methods of EPA SW-846, the fabric passes the Resource Conservation and Recovery Act (RCRA) standards, as stated in 40 C.F.R. § 261, such that it does not exhibit any of the characteristics of hazardous waste. The fabric can be a nylon spunbond that is thermally bonded with the pattern illustrated in U.S. Pat. No. 2,163,116. This fabric is sold under the trademarks PBN-II® and OIL SHARK® and is available from Cerex Advanced Fabrics, Inc. Other patterns can be used. Examples of fabrics that can be used with other patterns are a diamond patterned fabric sold under the trademarks ORION® and OIL SHARK® available from Cerex Advanced Fabrics, Inc. and a herringbone patterned fabric sold under the trademarks SPECTRAMAX® and OIL SHARK® available from Cerex Advanced Fabrics, Inc. Other polymers or combination of polymers can be used to make the fabric including but not limited to polyester and polypropylene. For example a fabric can be made from nylon, polyester, polypropylene, or any combination thereof, though embodiments are not limited thereto.

In an embodiment, a fabric of the subject invention passes the criteria for NSF/ANSI Standard 61 (can be found at www.nsf.org), which is the nationally (in the United States) recognized health standard for all devices, components, and materials that contact drinking water. As used herein, NSF/ANSI Standard 61 refers to NSF/ANSI Standard 61-2007a.

Spunbond fabrics are sometimes used to reinforce meltblown fabrics by making a composite fabric. The layers can be combined using ultrasonic welding equipment. This adds costs and complicates operations and logistics by adding inventory management issues of more raw materials, machine scheduling issues, and logistic issues such as raw material forecasting and ordering of these raw materials. Thus, a fabric or article that is not made from composite fabrics, that removes oil sheen from water, and that absorbs oil from water while retaining strength and integrity provides many benefits. In many embodiments, fabrics of the subject invention are not made from composite fabrics, are able to remove oil sheen from water, and are able to absorb oil from water while retaining strength and integrity.

In an embodiment a nonwoven fabric can be a nylon spunbond that has a basis weight of 0.3 osy as measured by ASTM test method D3776, thickness of about 4.1 mils as measured using ASTM D1777, machine direction grab tensile strength of at least about 6.2 $lb_f$ as measured using ASTM D5034, machine direction grab elongation of about 56% as measured using ASTM D5034, cross direction grab tensile strength of at least about 3.6 $lb_f$ as measured using ASTM D5034, cross direction grab elongation of about 63% as measured using ASTM D5034, machine direction trapezoidal tear strength of at least about 2.5 $lb_f$ as measured by ASTM D5587, cross direction trapezoidal tear strength of at least about 1.6 $lb_f$ measured by ASTM D5587, air permeability of about 2364 $ft^3/min/ft^2$ as measured by ASTM D737, a burst strength of at least about 8 $lb/in^2$ as measured by ASTM D3786, retention of at least about 87% of its machine direction grab strength as measured using ASTM D5034 when exposed to a xenon light source for 1000 hours, continuous nylon filaments, and wicks oil and water. This fabric will pass the criteria for SW-846, Third Edition which is the EPA standard for allowing wastes to be treated as non-hazardous waste. The fabric is thermally bonded with the pattern illustrated in U.S. Pat. No. 2,163,116. This fabric is sold under the trademarks PBN-II® and OIL SHARK® and is available from Cerex Advanced Fabrics, Inc. Other patterns can be used. Examples of fabrics that can be used with other patterns are a diamond patterned fabric sold under the trademarks ORION® and OIL SHARK® available from Cerex Advanced Fabrics, Inc. and a herringbone patterned fabric sold under the trademarks SPECTRAMAX® and OIL SHARK® available from Cerex Advanced Fabrics, Inc. Other polymers, along or in combination with nylon and/or each other, can be used to make the fabric including but not limited to polyester and polypropylene.

In another preferred embodiment, items can be made using a fabric that has a basis weight of 0.5 osy as measured by ASTM test method D3776, thickness of about 3.7 mils as measured using ASTM D1777, machine direction grab tensile strength of at least about 15.5 $lb_f$ as measured using ASTM D5034, machine direction grab elongation of about 44% as measured using ASTM D5034, cross direction grab tensile strength of at least about 8.7 $lb_f$ as measured using ASTM D5034, cross direction grab elongation of about 59% as measured using ASTM D5034, machine direction trapezoidal tear strength of at least about 7.1 $lb_f$ as measured by ASTM D5587, cross direction trapezoidal tear strength of at least about 4.4 $lb_f$ measured by ASTM D5587, a burst strength of at least about 16 $lb/in^2$ as measured by ASTM D3786, a mean pore size of about 87.5 microns, air permeability of about 1179 $ft^3/min/ft^2$ as measured by ASTM D737. The fabric can have continuous nylon filaments and can be capable of wicking oil and water.

This fabric is chemically bonded as described in U.S. Pat. No. 3,516,900 and U.S. Pat. No. 4,168,195 (as are fabrics according to certain other embodiments). The surface of this fabric is smooth with no point bonds (as are fabrics according to certain other embodiments). Woven fabrics can also be used, but they are typically more expensive to manufacture and can unravel when cut or deployed. Binding would need to be added to the edges of the woven fabrics, adding more cost.

Oil absorption of some of these nonwoven fabrics (e.g., nylon nonwoven fabrics) and their ability to separate oil from water has been studied and reported in U.S. Pat. No. 8,882,399 (Ser. No. 13/829,312), which is hereby incorporated herein by reference in its entirety, including all tables and figures. Further results on a broader range of basis weights are shown in Table 1 for crude oil and Table 2 for oil that has a viscosity of 320 centistokes. Pom poms or mop heads can be made from light weight fabrics by winding narrow strips of fabric around a reel or a similar device to make loops. The width of the strips can be about 3/2 inches wide. The strips can be any width such as 1/8, 1/4, 3/8, 1/2, 3/4, 5/8, 3/4, 7/8, 1, 9/8, 5/4, 11/8, 3/2, 13/8, 7/4, 15/8, 2 inches or wider. Using spunbond nylon provides several advantages. Nylon fabric will attract oil and water since nylon is both hydrophilic and oleophilic. The attraction of water to nylon will provide a motive force of bringing an oil and water mixture towards the fabric. This enables the nylon spunbond to remove oil sheen on water (e.g., the nylon spunbond can remove oil sheen on water caused by hydrocarbons, which is caused by a very low concentration of hydrocarbons on the surface of water—this is commonly observed in parking lots or retention ponds after a rainfall event).

In many embodiments, fabrics and items made from such fabrics can remove sheen (e.g., oil sheen) from water (e.g., from a water and oil mixture). Such fabrics can include nylon, polyester, polypropylene, or any combination thereof, though embodiments are not limited thereto. Such fabrics can be spunbond fabrics, though embodiments are not limited thereto. For example, a fabric that removes sheen from water of an oil and water mixture can be a nylon spunbond fabric, a polyester spunbond fabric, or a polypropylene spunbond fabric, or a spunbond fabric made from a combination of at least two of nylon, polyester, and polypropylene.

TABLE 1

Absorption of crude oil of fabrics of various basis weights.

| Type | Basis Weight (osy) | % Crude oil sorbed/ weight of nylon fabric |
| --- | --- | --- |
| SK300 | 2.94 | 296% |
| SK030 | 0.37 | 1079% |
| SK150 | 1.53 | 525% |
| SK040 | 0.36 | 1627% |
| SK200 | 2.16 | 441% |
| SK100 | 0.88 | 719% |
| SK085 | 0.88 | 771% |
| SK240 | 2.63 | 323% |
| SK050 | 0.48 | 987% |
| SK400 | 3.74 | 305% |
| SK070 | 0.60 | 1118% |
| SK300 | 3.10 | 356% |
| SK030 | 0.31 | 1417% |
| SK150 | 1.48 | 581% |
| SK040 | 0.42 | 1332% |
| SK200 | 2.02 | 489% |
| SK100 | 0.96 | 743% |
| SK085 | 0.86 | 839% |
| SK240 | 2.47 | 403% |
| SK050 | 0.49 | 1126% |
| SK400 | 3.77 | 352% |
| SK070 | 0.75 | 905% |

TABLE 2

Absorption of 320 centistokes oil of fabrics of various basis weights.

| Type | Basis Weight (osy) | % 320 centistokes oil sorbed/ weight of nylon fabric |
| --- | --- | --- |
| SK030 | 0.36 | 2317% |
| SK030 | 0.35 | 2605% |
| SK030 | 0.37 | 2474% |
| SK030 | 0.29 | 2645% |
| SK060 | 0.67 | 1655% |
| SK060 | 0.67 | 1541% |
| SK060 | 0.59 | 1797% |
| SK100 | 0.99 | 1345% |
| SK100 | 0.84 | 1390% |
| SK100 | 0.98 | 1278% |
| SK150 | 1.68 | 895% |
| SK150 | 1.52 | 958% |
| SK150 | 1.69 | 895% |
| SK150 | 1.81 | 844% |
| SK200 | 2.05 | 782% |
| SK200 | 2.04 | 860% |
| SK200 | 2.19 | 819% |
| SK200 | 2.15 | 788% |
| SK100 | 1.01 | 1437% |
| SK100 | 1.10 | 1351% |
| SK100 | 1.12 | 1381% |

In a preferred embodiment, the loops can be made from a 0.5 osy fabric about 3/2 inches wide and about 7 inches in diameter or about 22 inches when pulled straight. Pom poms of various weights can be made depending on their purpose by changing the number of loops. Pom poms can be made that weigh 0.05 pounds, 0.1 pounds, 0.15 pounds, 0.2 pounds, 0.25 pounds, 0.3 pounds, 0.35 pounds, 0.4 pounds, 0.45 pounds, 0.5 pounds, 0.55 pounds, 0.6 pounds, 0.65 pounds, 0.7 pounds, 0.75 pounds, 0.8 pounds, 0.85 pounds, 0.9 pounds, 0.95 pounds, 1 pounds, 1.05 pounds, 1.1 pounds, 1.15 pounds, 1.2 pounds, 1.25 pounds, 1.3 pounds, 1.35 pounds, 1.4 pounds, 1.45 pounds, 1.5 pounds, 1.75 pounds or more than 1.75 pounds. Pom poms can be made that weigh between about 0.1 pounds to about 0.5 pounds, about 0.3 pounds to about 0.7 pounds, about 0.5 pounds to about 0.8 pounds, about 0.7 pounds to about 0.9 pounds, about 0.8 pounds to about 1 pound, about 0.9 pounds to about 1.5 pounds, about 1.2 pounds to about 1.7 pounds, about 1.5 pounds to about 2 pounds or more than about 2 pounds. In a preferred embodiment, a pom pom that weighs about 1 pound can be made from 0.5 ounce per square yard Oil Shark® fabric style SK050. This pom pom will absorb about 10.5 times its weight in crude oil or about 10.5 pounds. A similar pom pom weighing about 1 pound made of 0.3 osy nylon spunbond fabric, SK030 will absorb about 14.2 times its weight in crude oil or about 14.2 pounds and about 26.5 times its weight in oil that has a viscosity of about 320 centistokes or about 26.5 pounds. Pom poms can be made from fabrics that have a basis weight of, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in ounces per square yard (osy)): 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5, 5.5, 6, 6.5, 7, 7.5, 8, 8.5, 9, 9.5, 10, 11, 12, 13, 14, 15, 16, 17, 18, 19, 20, 25, 30, 35, 40, 45, or 50. Other polymers like polyester and polypropylene, alone or in combination with nylon and/or each other, can be used, though embodiments are not limited thereto. In a preferred embodiment, a mix of nylon filaments and polypropylene filaments can be used.

Variations of pom poms can be fabricated by using colored material for at least one loop of a strip. This can be used to identify a specific type of pom pom or items made with pom poms for product identification. Different colors can be used such as red, orange, yellow, blue, green, indigo, violet, black, or white. Additionally, fluorescent colors such as fluorescent orange, fluorescent pink, fluorescent green, or fluorescent chartreuse can be used to provide more visibility. Also, optical brighteners can be used to enhance visibility under a black light. Other additives or colors modifiers can be used to provide desired optical effects. The basis weight of the colored or modified strip or strips can vary and does not have to be the same as the rest of the strips that make up the pom pom. In a preferred embodiment, at least one loop of 0.3 ounce per square yard fluorescent yellow fabric strip is incorporated into a pom pom to provide a distinctive appearance to the pom pom. The colored fabric strip can also be made from a polymer that is different from the rest of the strip if so desired, though embodiments are not limited thereto.

A mop can be fabricated by attaching any one of the pom poms described herein to a pole. The pole can be made of metal such as steel or aluminum or PVC pipe commercially available at a hardware store or a building supply store, though embodiments are not limited thereto. Holes (e.g., one or two holes) can be drilled on one end of the pipe, and the pom pom can be fastened to the end of the pipe. Any means of fastening the pom pom to the pipe can be used, including but not limited to wire ties or metal clips. Mops can also be fabricated using current manufacturing methods to make mop heads.

A sweep can be fabricated from lightweight nonwoven fabrics. For example, a sweep can be fabricated using any fabric described herein. In an embodiment, a sweep can be made using a fabric that has a basis weight of 0.5 osy as measured by ASTM test method D3776, thickness of about 5.9 mils as measured using ASTM D1777, machine direction grab tensile strength of at least about 12 $lb_f$ as measured using ASTM D5034, machine direction grab elongation of about 60% as measured using ASTM D5034, cross direction grab tensile strength of at least about 7.6 $lb_f$ as measured using ASTM D5034, cross direction grab elongation of about 63% as measured using ASTM D5034, machine direction trapezoidal tear strength of at least about 4.4 $lb_f$ as measured by ASTM D5587, cross direction trapezoidal tear strength of at least about 2.8 $lb_f$ measured by ASTM D5587, a burst strength of at least about 13 $lb/in^2$ as measured by ASTM D3786, a mean pore size of about 120 microns, air permeability of about 1516 $ft^3/min/ft^2$ as measured by ASTM D737, continuous nylon filaments, and wicks oil and water. This fabric will also pass the criteria for SW-846, Third Edition which is the EPA standard for allowing wastes to be treated as non-hazardous waste. One hundred feet of this sweep on a three inch paper core can have a diameter of about 5.5 inches. In another embodiment, 84 feet of a 0.6 osy Type 23 nylon chemically bonded nylon spunbond fabric on a 1.5-inch core can have a diameter of approximately 9 inches.

In yet another embodiment, a sweep can be made using a fabric has a basis weight of 2 osy as measured by ASTM test method D3776, thickness of about 15 mils as measured using ASTM D1777, machine direction grab tensile strength of at least about 70 $lb_f$ as measured using ASTM D5034, machine direction grab elongation of about 80% as measured using ASTM D5034, cross direction grab tensile strength of at least about 50 $lb_f$ as measured using ASTM D5034, cross direction grab elongation of about 89% as measured using ASTM D5034, machine direction trapezoidal tear strength of at least about 23 $lb_f$ as measured by ASTM D5587, cross direction trapezoidal tear strength of at least about 15 $lb_f$ measured by ASTM D5587, a burst strength of at least about 51 $lb/in^2$ as measured by ASTM D3786, a mean pore size of about 43 microns, an air permeability of about 353 $ft_3/min/ft_2$ as measured by ASTM D737, continuous nylon filaments and wicks oil and water. This fabric passes the criteria for SW-846, Third Edition, which is the EPA standard for allowing wastes to be treated as non-hazardous waste. This fabric is a thermally bonded nylon nonwoven commercially available from Cerex Advanced Fabrics in Cantonment, Fla. under the trademarks Oil Shark® and PBN-II®. These and other fabrics can be fabricated into a sweep that is about 19 inches wide and 100 feet long. Other polymers like polyester and polypropylene or combinations of these polymers with nylon or themselves can be used. In a preferred embodiment, a mix of nylon filaments and polypropylene filaments can be used. One hundred feet of this sweep on a three inch paper core can have a diameter of about 8.2 inches.

One edge of the fabric can be folded over about 1 inch and seamed creating a small tube in the longitudinal direction of the fabric. A rope about ½ inches to about ¾ inches in diameter can be inserted into the tube, and about 10 to 20 inches can be extended from each end of the fabric for handling and pulling the sweep. The rope can also be placed on one edge of the fabric prior to sewing the narrow tube as an alternative fabrication method. In a preferred embodiment, a 100 foot sweep can be made using a spunbond nylon fabric, Oil Shark® SK100 commercially available from Cerex Advanced Fabrics, Inc. in Cantonment, Fla., that has a basis weight of 1.0 osy as measured by ASTM test method D3776, thickness of about 9.3 mils as measured using ASTM D1777, machine direction grab tensile strength of at least about 29.9 $lb_f$ as measured using ASTM D5034, machine direction grab elongation of about 69% as measured using ASTM D5034, cross direction grab tensile strength of at least about 20.9 $lb_f$ as measured using ASTM D5034, cross direction grab elongation of about 75% as measured using ASTM D5034, machine direction trapezoidal tear strength of at least about 10.5 $lb_f$ as measured by ASTM D5587, cross direction trapezoidal tear strength of at least about 6.5 $lb_f$ measured by ASTM D5587, a burst strength of at least about 24 $lb/in^2$ as measured by ASTM D3786, a mean pore size of about 57.4 microns, air permeability of about 774 $ft_3/min/ft_2$ as measured by ASTM D737, continuous nylon filaments, and wicks oil and water. This fabric will also pass the criteria for SW-846, Third Edition which is the EPA standard for allowing wastes to be treated as non-hazardous waste. The nylon fabric can be thermally bonded with the pattern illustrated in U.S. Pat. No. 2,163, 116. This fabric is sold under the trademarks PBN-II® and OIL SHARK® and is available from Cerex Advanced Fabrics, Inc. Other patterns can be used. Examples of fabrics that can be used with other patterns are a diamond patterned fabric sold under the trademarks ORION® and OIL SHARK® available from Cerex Advanced Fabrics, Inc. and a herringbone patterned fabric sold under the trademarks SPECTRAMAX® and OIL SHARK® available from Cerex Advanced Fabrics, Inc. Other polymers or combination of polymers can be used to make the fabric including but not limited to polyester and polypropylene. This sweep has a diameter about 8 to 8.5 inches when rolled up.

In yet another embodiment, a fabric can be used to make a sweep that has a basis weight of 2 osy as measured by ASTM test method D3776, thickness of about 8.4 mils as measured using ASTM D1777, machine direction grab tensile strength of at least about 73 $lb_f$ as measured using ASTM D5034, machine direction grab elongation of about 60% as measured using ASTM D5034, cross direction grab tensile strength of at least about 47 $lb_f$ as measured using ASTM D5034, cross direction grab elongation of about 64% as measured using ASTM D5034, machine direction trapezoidal tear strength of at least about 15 $lb_f$ as measured by ASTM D5587, cross direction trapezoidal tear strength of at least about 9.9 $lb_f$ measured by ASTM D5587, a burst strength of at least about 67 $lb/in^2$ as measured by ASTM D3786, a mean pore size of about 28.9 microns, air permeability of about 170 $ft^3/min/ft^2$ as measured by ASTM D737, continuous nylon filaments, and wicks oil and water. The fabric is chemically bonded as described in U.S. Pat. No. 3,516,900 and U.S. Pat. No. 4,168,195. The surface of this fabric is smooth with no point bonds. Woven fabrics can also be used but they are typically more expensive to manufacture and can unravel when cut or deployed. Binding would need to be added to the edges of the woven fabrics, adding more cost.

Sweeps can be made from a fabric that has a basis weight of, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in ounces per square yard (osy)): 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5, 5.5, 6, 6.5, 7, 7.5, 8, 8.5, 9, 9.5, 10, 11, 12, 13, 14, 15, 16, 17, 18, 19, 20, 25, 30, 35, 40, 45, or 50.

Snares can be made using the pom poms from any of the embodiments as previously described by fastening any number of pom poms to a rope. Other devices besides rope that fasten the pom poms together can be used, such as a strip of fabric or a wire. The rope to make the snare can be of any length. In preferred embodiments the length of the rope is less than 5 feet, 5 feet, 10 feet, 12 feet, 15 feet, 20 feet, 24 feet, 25 feet, 30 feet, 35 feet, 36 feet, 40 feet, 45 feet, 48 feet, 50 feet or more than 50 feet long. The rope can be of any diameter and any material. Any type of fastening method can be used including but not limited to wire ties, metal clips, metal rings, bale ties or wire ties. The pom poms can be of any desired weight as described in previous embodiments and examples. The snares can have 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or more pom poms attached to a rope. The distance between pom poms can be less than about 1 inch, about 1 inch to about 3 inches, about 3 inches to about 5 inches, about 5 inches to about 7 inches, about 7 inches to about 9 inches, about 9 inches to about 11 inches, about 11 inches to about 13 inches, about 13 inches to about 15 inches, about 15 inches to about 17 inches, about 17 inches to about 19 inches, about 19 inches to about 21 inches, about 21 inches to about 23 inches, about 23 inches to about 25 inches, about 25 inches to about 27 inches, about 27 inches to about 29 inches, about 29 inches to about 31 inches or more than about 30 inches. The length of the pom poms when pulled straight can be less than about 1 inch, about 1 inch to about 3 inches, about 3 inches to about 5 inches, about 5 inches to about 7 inches, about 7 inches to about 9 inches, about 9 inches to about 11 inches, about 11 inches to about 13 inches, about 13 inches to about 15 inches, about 15 inches to about 17 inches, about 17 inches to about 19 inches, about 19 inches to about 21 inches, about 21 inches to about 23 inches, about 23 inches to about 25 inches, about 25 inches to about 27 inches, about 27 inches to about 29 inches, about 29 inches to about 31 inches or more than about 30 inches.

Embodiments of the subject invention also include methods of cleaning up spilled hydrocarbons and/or other organic compounds (e.g., crude oil) from the environment (e.g., by removing the spilled material(s)). Such embodiments include using a fabric or item including a fabric as described herein to absorb the spilled material (e.g., oil, such as crude oil). Such material can be removed from, for example, water, such as a body of water. Methods of the subject invention can include using the fabric or item including the fabric to absorb and/or remove oil in any way as described herein and/or in any way known in the art.

Embodiments of the subject invention also include fabricating a fabric or item including a fabric as described herein. A fabric can be formed by, for example: forming, in an extruder, a master batch comprising at least one polymer; extruding the master batch in the form of a plurality of filaments; depositing the filaments onto a collection surface to form a web; and thermally bonding the filaments of the web to form the nonwoven fabric. The fabric can have any combination of the properties described herein and can include nylon, polyester, polypropylene, or any combination thereof, though embodiments are not limited thereto. Fabrication of any of the items described herein that include a fabric can further include using the fabric to form the item (e.g., forming a snare as described herein).

Articles comprised of fabrics that can absorb oil and remove oil sheen on water can be constructed from a variety of components and layers. Oil sheen on water is defined as oil on top of water that settles as a thin film layer that causes the thin layer to shimmer because of an optical phenomenon called interference. The shimmering can be in different colors. In an embodiment, batting can be placed in between two layers of spunbond fabric. The batting can be of various basis weights and various thicknesses. For example, in one embodiment the batting can have a basis weight between about 0.5 ounce per square yard (osy) as measured using American Society for Testing and Materials test method (ASTM) D3776 and 11.8 osy and a thickness between about 0.015 inches and 2 inches. The maximum thickness of the batting is measured with a caliper that just makes contact with the batting surface. The batting can be made of fibers of many polymers or a combination of polymers such as but not limited to nylon, polyester, polypropylene, polyethylene, polybutylene terephthalate and other polymers. Recycled materials can also be used. Other materials or a combination of materials can also be used for the absorbent material such as cotton, cellulose, super absorbent polymer, yarn, meltblown, slit film, Styrofoam waste or Styrofoam powder and a variety of other materials including recycled materials. There are several advantages of using batting. Batting is very porous and has a low density. This allows absorbed material to reside in the space between the fibers increasing the amount of absorbed material compared to the initial dry weight of the batting. Batting can also be compressed and then it will regain its thickness once the compression load force is taken off it. This allows more batting to be packed into a box for shipping increasing the total amount of oil that can be potentially absorbed per shipment of absorbent articles. This is especially advantageous when shipping material off shore to shallow or deep water oil rigs or ships where space is limited.

The outer spunbond layers can be of various basis weights and various thicknesses. The outer layers can be made of many polymers or a combination of polymers such as but not limited to nylon, polyester, polypropylene, polyethylene, polybutylene terephthalate and other polymers. Various combinations of spunbond layers and batting can be used to create an article that can absorb at least about 14.3 times its dry weight in oil with a viscosity of 320 centistokes. The layers can be combined using common methods known in the art such as sewing, stitch bonding, ultrasonic welding, radio frequency welding and laminating. An adhesive that does not dissolve in water or in hydrocarbons can also be used.

Measurements were conducted to define the sorption behavior of commercially available nylon spunbond fabrics. The fabric used in this study was Type SK, OIL SHARK® nylon spunbond fabric. This fabric is comprised of four denier per filament nylon fibers. Eleven fabrics of different basis weights were sampled by cutting three inch square specimens and weighing them before and after soaking them in crude oil of about 2 centistokes viscosity. The crude oil was obtained from a well in Louisiana and is commonly referred to as Louisiana sweet crude oil. The gear lube oil is Mobil® Spartan® EP320 Gear Lube Oil. The sorption of crude oil by nylon spunbond fabrics was determined by cutting twenty-two specimens that were three inches square. Two specimens were selected for each of eleven basis weights. These specimens were weighed before and after soaking them in crude oil. The amount of oil sorbed was then calculated from the weights and the percent of crude oil sorbed using the weight of the specimen prior to soaking it in oil as the base. Table 3 lists the results.

TABLE 3

Sorption of crude oil of fabrics of various basis weights

| Type | Basis Weight (osy) | % Crude oil sorbed/ weight of nylon fabric |
|---|---|---|
| SK300 | 2.94 | 296% |
| SK030 | 0.37 | 1079% |
| SK150 | 1.53 | 525% |
| SK040 | 0.36 | 1627% |
| SK200 | 2.16 | 441% |
| SK100 | 0.88 | 719% |
| SK085 | 0.88 | 771% |
| SK240 | 2.63 | 323% |
| SK050 | 0.48 | 987% |
| SK400 | 3.74 | 305% |
| SK070 | 0.60 | 1118% |
| SK300 | 3.10 | 356% |
| SK030 | 0.31 | 1417% |
| SK150 | 1.48 | 581% |
| SK040 | 0.42 | 1332% |
| SK200 | 2.02 | 489% |
| SK100 | 0.96 | 743% |
| SK085 | 0.86 | 839% |
| SK240 | 2.47 | 403% |
| SK050 | 0.49 | 1126% |
| SK400 | 3.77 | 352% |
| SK070 | 0.75 | 905% |

Similarly, the sorption of 320 centistokes gear lube oil by nylon spunbond fabrics was determined by cutting three or four specimens for selected basis weights that were two or three inches square. The gear lube oil is Mobil® Spartan® EP320 Gear Lube Oil. Three, four or seven specimens were selected for each of seven basis weights. As previously described, these specimens were weighed before and after soaking them in this oil and then the amount of oil sorbed was calculated from the weights and the percent of 320 centistokes oil sorbed. Table 4 shows the results.

TABLE 4

Sorption of 320 cStokes oil of fabrics of various basis weights

| Type | Basis Weight (osy) | % 320 centistokes oil sorbed/ weight of nylon fabric |
|---|---|---|
| SK030 | 0.36 | 2317% |
| SK030 | 0.35 | 2605% |
| SK030 | 0.37 | 2474% |
| SK030 | 0.29 | 2645% |
| SK050 | 0.56 | 2351% |
| SK050 | 0.42 | 1788% |
| SK050 | 0.58 | 1875% |
| SK060 | 0.67 | 1655% |
| SK060 | 0.67 | 1541% |
| SK060 | 0.59 | 1797% |
| SK085 | 0.74 | 1578% |
| SK085 | 0.82 | 1429% |
| SK085 | 0.79 | 1483% |
| SK100 | 0.99 | 1345% |
| SK100 | 0.84 | 1390% |
| SK100 | 0.98 | 1278% |
| SK150 | 1.68 | 895% |
| SK150 | 1.52 | 958% |
| SK150 | 1.69 | 895% |
| SK150 | 1.81 | 844% |
| SK200 | 2.05 | 782% |
| SK200 | 2.04 | 860% |
| SK200 | 2.19 | 819% |
| SK200 | 2.15 | 788% |
| SK100 | 1.01 | 1437% |
| SK100 | 1.10 | 1351% |
| SK100 | 1.12 | 1381% |

In an embodiment the spunbond can have a basis weight between about 0.25 osy and 4 osy as measure by ASTM D3776 and a thickness between about 0.002 inches and 0.023 inches as measured by ASTM D1777. Layers can be combined in a variety of ways including ultrasonically seaming channels, stitching rows longitudinally in a stitch bonding machine, gluing or laminating the layers of material together and calendaring.

In a specific embodiment, four layers of 0.3 osy nylon spunbond fabric can be combined to make a pad that has a basis weight of about 1.2 osy. Style SK030, Oil Shark® fabric, commercially available from Cerex Advanced Fabrics, Inc. in Cantonment, Fla. can be used. This pad will absorb about 12.5 times its dry weight in crude oil and about 25.1 times its dry weight of gear lube oil of 320 centistokes viscosity. This is the average of the results of the samples tested in Table 3 and Table 4, respectively. In another specific embodiment, four layers of 0.5 osy nylon spunbond fabric can be combined to make a pad that has a basis weight of about 2 osy. Style SK050, Oil Shark® fabric commercially available from Cerex Advanced Fabrics, Inc. in Cantonment, Fla. can be used. This pad will absorb about 10.6 times its dry weight in crude oil and about 20.1 times its dry weight of gear lube oil of 320 centistokes viscosity. This is the average of the results of the samples tested in Table 3 and Table 4, respectively. In still another similar embodiment, four layers of 0.85 osy nylon spunbond fabric can be combined to make a pad that has a basis weight of about 3.4 osy. Style SK085, Oil Shark® fabric commercially available from Cerex Advanced Fabrics, Inc. in Cantonment, Fla. can be used. This pad will absorb about 8.1 times its dry weight in crude oil and 15 times its dry weight of gear lube oil of 320 centistokes viscosity. This is the average of the results of the samples tested in Table 3 and Table 4, respectively. Other pads can be made using various basis weights and the absorption performance can be calculated using the average of the results for the selected basis weights in Tables 3 and 4. Any permutation or combination of layers can be used. Fabrics of different basis weights can be mixed in the same article. Fabrics made from other polymers or combinations of polymers including but not limited to nylon, polyester, polybutylene terephthalate (PBT), polyethylene and polypropylene can be used to make similar layers to make the articles. The layers can be made from filaments that comprise more than one polymer such as bicomponent or tricomponent filaments or a mixture of single component filaments made from different polymers. Filaments of different cross sections can be used. Filament types and cross sections include but are not limited to round, multilobal, cross, and hollow.

In another embodiment, batting and two layers are combined by stitching the layers longitudinally. In a specific embodiment an article can be made that is about 19 inches wide and 19 inches long by stitching the layers longitudinally on the edge and stitching at least one inch wide longitudinal rows. The article can be made at any length desired. In another embodiment a sack can be made that is approximately 19 inches wide by about 24 inches long similar to a pillow case. Three edges of the sack can be seamed with, for example, a surged seam. The fourth edge can be left open for inserting absorbent material. Batting of various basis weights or thicknesses can then be inserted into this sack and seamed shut. In an embodiment, polyester batting made from recycled bottles is inserted in this sack. In a specific embodiment, a spunbond nylon fabric with a basis weight between about 0.3 osy and about 4.0 osy can be used to make the sack. Polyester batting with a basis weight between about 0.5 osy and about 8 osy can be inserted into the sack to create an absorbent article. The sack is then seamed on the open edge. If so desired, more seams can be added away from the edges to prevent the batting from sliding inside the spunbond sack. In an embodiment, a seam can be added in the middle of the sack. Any seaming method and equipment can be used such as but not limited to glue seaming, hot melt seaming, sewing machines, ultrasonic seaming and radio frequency seaming. Different kinds of sewn seams such as but not limited to straight, surged, sinusoidal, scalloped, diamond, square, rectangular and angular can be used.

In another embodiment, an article that is about 18 inches wide and about 18 inches long is made with two outer layers of 0.3 osy nylon spunbond fabric and 3 osy batting in between the two layers. The layers are stitched on the longitudinal edge and then six inches from each edge at about 6 inches from one edge and 12 inches from this same edge. Any number of longitudinal rows of stitching can be used as long as the fluid to be absorbed can penetrate the outer layer to the inner batting layer. Rows of stitching can be 0.25, 0.5, 0.75, 1, 1.25, 1.5, 1.75, 2, 2.25, 2.5, 2.75, 3 or more inches apart. In a specific embodiment, an article that is about 18 inches wide and about 18 inches long is made with two outer layers of 0.3 osy nylon spunbond and 5 osy batting in between the two layers of spunbond. The layers are stitched on the longitudinal edges and then six inches from each edge at about 6 inches from one edge and 12 inches from this same edge.

In another embodiment, an 18 inch wide article is made with two outer layers of 0.3 osy nylon spunbond and 5 osy batting in between the two layers. The layers are stitched on the longitudinal edge and then six inches from each edge at about 6 inches from one edge and 12 inches from this same edge. In yet another embodiment, an 18 inch wide article is made with two outer layers of 0.3 osy nylon spunbond and 5 osy batting in between the two layers. The layers are stitched on the longitudinal edge and then two, six, twelve and eighteen inches from one edge. This article will absorb about at least 36 times its dry weight of oil with a viscosity of 320 centistokes. About between 30 to 40 times this article's dry weight of oil with a viscosity of 320 centistokes is absorbed by this article as compared to 7 to 11 times the dry weight of pads made with melt blown and spunbond polypropylene. In another specific embodiment, 3 osy batting can be sandwiched between two layers of 0.3 osy spunbond nylon fabric to make an article that is 18 inches wide and 18 inches long. This article will absorb about 40 times its dry weight of oil with a viscosity of 320 centistokes.

One skilled in the art will realize that there are many different permutations of the method of the way the layers can be combined. These permutations include the number of longitudinally stitched rows. Likewise, if other methods of combining the layers are used, for example, ultrasonically welding longitudinal rows, many permutations can be used to accomplish the intent of the invention.

Other polymers or combination of polymers including but not limited to polyester and polypropylene can be used to make similar layers to make the articles. Materials used to make layers of the subject invention can include nylon, polyester, polypropylene, or any combination thereof. The layers can be made from filaments that comprise more than one polymer such as bicomponent or tricomponent filaments. One spunbond fabric that can be used is thermally bonded with the pattern illustrated in U.S. Pat. No. 2,163, 116. This fabric is sold under the trademarks PBN-II® and OIL SHARK® and is available from Cerex Advanced Fabrics, Inc. in Cantonment, Fla. According to many embodiments of the subject invention, a thermally bonded fabric can be bonded over about 17% to 25% of the fabric area. These bond points are not porous and are actually tiny areas of film in the fabric. Other patterns can be used. Examples of fabrics that can be used with other patterns are a diamond patterned fabric sold under the trademarks ORION® and OIL SHARK® available from Cerex Advanced Fabrics, Inc. and a herringbone patterned fabric sold under the trademarks SPECTRAMAX® and OIL SHARK® available from Cerex Advanced Fabrics, Inc.

In a preferred embodiment, the PBN-II® spunbond fabric used for the outer layers has a basis weight of about 0.3 osy as measured using American Society for Testing and Materials test method (ASTM) D3776, thickness of about 0.041 inches as measured using ASTM D1777, machine direction grab tensile strength of at least about 6.2 $lbs_f$ as measured using ASTM D5034, machine direction grab elongation of about 56% as measured using ASTM D5034, cross direction grab tensile strength of at least about 3.6 $lbs_f$ as measured using ASTM D5034, cross direction grab elongation of about 63% as measured using ASTM D5034, machine direction trapezoidal tear strength of at least about 2.5 $lbs_f$ as measured by ASTM D5587, cross direction trapezoidal tear strength of at least about 1.6 $lbs_f$ as measured by ASTM D5587, air permeability of about 2364 $ft^3/min/ft^2$ as measured by ASTM D737, a burst strength of at least about 8 pounds per square inch (PSI) as measured by ASTM D3786 and a mean pore size of about 90 microns. This fabric is made of continuous nylon filaments, and wicks oil and water. Using spunbond nylon provides several advantages. Nylon fabric will attract oil and water since nylon is both hydrophilic and oleophilic. The attraction of water to nylon will provide a motive force of bringing an oil-water mixture towards the fabric. This enables the nylon spunbond to remove oil sheen on water caused by hydrocarbons which is caused by a very low concentration of hydrocarbons on the surface of water. This is commonly observed in parking lots or retention ponds after a rainfall event.

Mean pore size of the fabric can be measured by any suitable method known in the art. For example, the mean pore size can be measured using an instrument as discussed in a publication by Jena et al. (Jena, A. and Gupta, K., Advances in Pore Structure Evaluation by Porometry, Porous Materials Inc., http://www.pmiapp.com/publications/docs/Review-Papers/Advances-in-P-ore-Structure-Evaluation-by-Porometry.pdf), which is hereby incorporated by reference in its entirety. A fabric that will pass the criteria for SW-846, Third Edition which is the EPA standard for allowing wastes to be treated as non-hazardous waste can be used. The EPA publication SW-846, Third Edition entitled Test Methods for Evaluating Solid Waste, Physical/Chemical Methods, is Waste's official compendium of analytical and sampling methods that have been evaluated and approved for use in complying with the RCRA (Resource Conservation and Recovery Act) regulations. SW-846 Third Edition functions primarily as a guidance document setting forth acceptable, although not required, methods for the regulated and regulatory communities to use in responding to RCRA-related sampling and analysis requirements. Oil Shark® style SK400 and PBN-II® style 30400 available from Cerex Advanced Fabrics, Inc. in Cantonment Fla. will meet the criteria for SW-846, Third Edition and can be used to make these articles. All basis weights of Oil Shark® Type SK and PBN-II® Type 30 fabrics will meet the criteria for SW-846, Third Edition. All Oil Shark® Type SK and PBN-II® Type 30 fabrics also meet the definition of a sorbent as specified in Title 40 of the Code of Federal Regulations (CFR), sections 300.5 and 300.195 (g) of the National Contingency Plan (NCP).

In another embodiment the nonwoven fabric can be a spunbond that has a basis weight of 4 osy as measured by ASTM test method D3776, thickness of about 22.3 mils as measured using ASTM D1777, machine direction grab tensile strength of at least about 157 $lbs_f$ as measured using ASTM D5034, machine direction grab elongation of about 91% as measured using ASTM D5034, cross direction grab tensile strength of at least about 119 $lbs_f$ as measured using ASTM D5034, cross direction grab elongation of about 100% as measured using ASTM D5034, machine direction trapezoidal tear strength of at least about 49 $lbs_f$ as measured by ASTM D5587, cross direction trapezoidal tear strength of at least about 34.2 $lbs_f$ measured by ASTM D5587, air permeability of about 125 $ft^3/min/ft^2$ as measured by ASTM D737, a burst strength of at least about 109.4 PSI as measured by ASTM D3786, a mean pore size of about 31 microns, retention of at least about 87% of its machine direction grab strength as measured using ASTM D5034 when exposed to a xenon light source for 1000 hours, continuous nylon filaments, and wicks oil and water. This fabric will pass the criteria for SW-846, Third Edition which is the EPA standard for allowing wastes to be treated as non-hazardous waste.

Other polymers or combinations of polymers including but not limited to nylon, polyester and polypropylene can be used to make a similar fabric. The fabric can be made from filaments that comprise more than one polymer such as bicomponent or tricomponent filaments. The fabric is thermally bonded with the pattern illustrated in U.S. Pat. No. 2,163,116. This fabric is sold under the trademarks PBN-II® and OIL SHARK® and is available from Cerex Advanced Fabrics, Inc. Other patterns can be used. Examples of fabrics that can be used with other patterns are a diamond patterned fabric sold under the trademarks ORION® and OIL SHARK® available from Cerex Advanced Fabrics, Inc. and a herringbone patterned fabric sold under the trademarks SPECTRAMAX® and OIL SHARK® available from Cerex Advanced Fabrics, Inc.

In yet another embodiment a fabric has a basis weight of 2 osy as measured by ASTM test method D3776, thickness of about 15 mils as measured using ASTM D1777, machine direction grab tensile strength of at least about 70 $lbs_f$ as measured using ASTM D5034, machine direction grab elongation of about 80% as measured using ASTM D5034, cross direction grab tensile strength of at least about 50 $lbs_f$ as measured using ASTM D5034, cross direction grab elongation of about 89% as measured using ASTM D5034, machine direction trapezoidal tear strength of at least about 23 $lbs_f$ as measured by ASTM D5587, cross direction trapezoidal tear strength of at least about 15 $lbs_f$ measured by ASTM D5587, a burst strength of at least about 51 PSI as measured by ASTM D3786, a mean pore size of about 43 microns, air permeability of about 353 $ft^3/min/ft^2$ as measured by ASTM D737, continuous nylon filaments, and wicks oil and water. This fabric will also pass the criteria for SW-846, Third Edition which is the EPA standard for allowing wastes to be treated as non-hazardous waste.

Other polymers or combinations of polymers including but not limited to polyester and polypropylene can be used to make a similar fabric. The fabric can be made from filaments that comprise more than one polymer such as bicomponent or tricomponent filaments. The fabric is thermally bonded with the pattern illustrated in U.S. Pat. No. 2,163,116. This fabric is sold under the trademarks PBN-II® and OIL SHARK® and is available from Cerex Advanced Fabrics, Inc. Other patterns can be used. Examples of fabrics that can be used with other patterns are a diamond patterned fabric sold under the trademarks ORION® and OIL SHARK® available from Cerex Advanced Fabrics, Inc. and a herringbone patterned fabric sold under the trademarks SPECTRAMAX® and OIL SHARK® available from Cerex Advanced Fabrics, Inc.

In yet another embodiment a fabric has a basis weight of 0.5 osy as measured by ASTM test method D3776, thickness of about 5.9 mils as measured using ASTM D1777, machine direction grab tensile strength of at least about 12 $lbs_f$ as measured using ASTM D5034, machine direction grab elongation of about 60% as measured using ASTM D5034, cross direction grab tensile strength of at least about 7.6 $lbs_f$ as measured using ASTM D5034, cross direction grab elongation of about 63% as measured using ASTM D5034, machine direction trapezoidal tear strength of at least about 4.4 $lbs_f$ as measured by ASTM D5587, cross direction trapezoidal tear strength of at least about 2.8 $lbs_f$ measured by ASTM D5587, a burst strength of at least about 13 PSI as measured by ASTM D3786, a mean pore size of about 120 microns, air permeability of about 1516 $ft^3/min/ft^2$ as measured by ASTM D737, continuous nylon filaments, and wicks oil and water. This fabric will also pass the criteria for SW-846, Third Edition which is the EPA standard for allowing wastes to be treated as non-hazardous waste. In another embodiment the nonwoven fabric can be a spunbond that has a basis weight of 0.3 osy as measured by ASTM test method D3776, thickness of about 4.1 mils as measured using ASTM D1777, machine direction grab tensile strength of at least about 6.2 lbs$_f$ as measured using ASTM D5034, machine direction grab elongation of about 56% as measured using ASTM D5034, cross direction grab tensile strength of at least about 3.6 lbs$_f$ as measured using ASTM D5034, cross direction grab elongation of about 63% as measured using ASTM D5034, machine direction trapezoidal tear strength of at least about 2.5 lbs$_f$ as measured by ASTM D5587, cross direction trapezoidal tear strength of at least about 1.6 lbs$_f$ measured by ASTM D5587, air permeability of at about 2364 ft$^3$/min/ft$^2$ as measured by ASTM D737, a burst strength of at least about 8 PSI as measured by ASTM D3786, retention of at least about 87% of its machine direction grab strength as measured using ASTM D5034 when exposed to a xenon light source for 1000 hours, continuous nylon filaments, and wicks oil and water. This fabric will pass the criteria for SW-846, Third Edition which is the EPA standard for allowing wastes to be treated as non-hazardous waste.

Other polymers including but not limited to polyester and polypropylene can be used to make a similar fabric. The fabric can be made from filaments that comprise more than one polymer such as bicomponent or tricomponent filaments. The fabric is thermally bonded with the pattern illustrated in U.S. Pat. No. 2,163,116. This fabric is sold under the trademarks PBN-II® and OIL SHARK® and is available from Cerex Advanced Fabrics, Inc. Other patterns can be used. Examples of fabrics that can be used with other patterns are a diamond patterned fabric sold under the trademarks ORION® and OIL SHARK® available from Cerex Advanced Fabrics, Inc. and a herringbone patterned fabric sold under the trademarks SPECTRAMAX® and OIL SHARK® available from Cerex Advanced Fabrics, Inc. Woven fabrics can also be used but they are typically more expensive to manufacture and can unravel when cut or deployed. Binding would need to be added to the edges of the woven fabrics adding more cost.

In yet another embodiment a fabric has a basis weight of 2 osy as measured by ASTM test method D3776, thickness of about 8.4 mils as measured using ASTM D1777, machine direction grab tensile strength of at least about 73 lbs$_f$ as measured using ASTM D5034, machine direction grab elongation of about 60% as measured using ASTM D5034, cross direction grab tensile strength of at least about 47 lbs$_f$ as measured using ASTM D5034, cross direction grab elongation of about 64% as measured using ASTM D5034, machine direction trapezoidal tear strength of at least about 15 lbs$_f$ as measured by ASTM D5587, cross direction trapezoidal tear strength of at least about 9.9 lbs$_f$ measured by ASTM D5587, a burst strength of at least about 67 PSI as measured by ASTM D3786, a mean pore size of about 28.9 microns, air permeability of about 170 ft$^3$/min/ft$^2$ as measured by ASTM D737, continuous nylon filaments, and wicks oil and water. The fabric is chemically bonded as described in U.S. Pat. No. 3,516,900 and U.S. Pat. No. 4,168,195. The surface of this fabric is smooth with no point bonds. Other polymers can be used to make a similar fabric including but not limited to polyester and polypropylene. This fabric is sold under the trademarks Cerex® and OIL SHARK® and is available from Cerex Advanced Fabrics, Inc. Woven fabrics can also be used but they are typically more expensive to manufacture and can unravel when cut or deployed. Binding would need to be added to the edges of the woven fabrics adding more cost.

In several embodiments a nylon fabric is used to make an absorbent article. Nylon fabrics are a particularly good use for this application. There are several advantageous mechanisms of oil adhering to nylon fabric when oil is dispersed in a water system. Oil will be attracted to nylon by natural forces. These forces include mechanisms such as the chemical bonding of oil to the aliphatic portion of the nylon 6,6 molecules and the physical adsorption of oil. The aliphatic portion of the nylon molecule makes it oleophilic.

The surface energy is defined as the sum of all intermolecular forces that are on the surface of a material, the degree of attraction or repulsion force of a material surface exerts on another material. In the case of liquids this same definition is applied to define the surface tension as a result of this surface tension liquid with low surface tends to contract and form droplets. Surface tension can be defined as the resistance of a fluid to deform or break, such resistance is defined directly by the intermolecular forces that are on the liquid surface. When the substrate has a high surface energy, i.e. it tends to attract, and the adhesive has a low surface tension, has little resistance to deformation or rupture, a good wetting of the adhesive on the substrate is produced. For example, silicone adhesives have a low surface tension; this is the main reason why these adhesive bond on a wide range of substrates. On the other hand, those substrates which contain silicone surfaces have a low surface energy and because of this reason, they are very difficult to get a good wettability and a good adhesion with any material unless a surface treatment is done to remove the silicone and increase surface energy of the substrate surface.

The nylon fabric will also affect the stability of the water film between the surface of the fabric and the oil. Since the oil is in an emulsion with water, the hydrophilicity of nylon fabric will also provide more motive force to attract the emulsion to the fabric, hence, increasing the rate at which the oil initially adheres to the fabric. The surface energy of nylon in an n-alkane/water system is higher than polyester (polyethylene terephthalate or PET) and polyethylene, 52.9 milliJoules per square meter (mJ/m$^2$) versus 40 mJ/m$^2$ and 23.1 mJ/m$^2$, respectively. This means that nylon is more hydrophilic than polyester and polyester is more hydrophilic than polyethylene in an n-alkane/water system that is similar to crude oil in water. The moisture regain of nylon 6,6 at 50% relative humidity and 23° C. is 2.5% as compared to polyethylene terephthalate (PET) at about 0.2-0.5% and polypropylene at about 0.03%. Thus, nylon 6,6 is both hydrophilic and oleophilic. When nylon fabrics are used to absorb oil no oil sheen on water is observed once all the oil has been collected. The nylon spunbond fabric not only absorbs the oil but also removes the oil sheen caused by very small amounts of oil in the water. Fabrics made from other polymers such as polyester and polypropylene will also work but it may take more time and mass to remove all the oil sheen since these fabrics do not have the same affinity for water as nylon. Both top and bottom surfaces of nylon fabric will be available to absorb oil sheen when deployed on the surface of water because of the ability of nylon fabric to become wet by water or the hydrophilic behavior of nylon. Polyester and polypropylene will not behave this way since they are both hydrophobic.

Dyes or other materials that impart high visibility colors (e.g., orange and red) commonly include hazardous materials, for example, metals such as hexavalent chromium and/or lead. Only a few materials exist that that can impart high visibility colors, do not contain these hazardous materials, and can tolerate the high temperatures required in processing polymer pellets into fabrics. In certain embodiments, a nonwoven fabric used to make articles that absorb oil or remove oil sheen from the surface of water as described herein can include one or more dyes or other materials, thereby resulting in a nonwoven fabric with a high visibility color (e.g., orange or red). Such a dye or other material does not contain hazardous materials, such as hexavalent chromium or lead. In a particular embodiment, a combination of a solvent red dye and a solvent orange dye can be added to a nylon extrusion system to make a strong nonwoven fabric with a high visibility color (orange or orange-ish) that can be used to provide an article that can absorb oil or remove oil sheen from the surface of water. This fabric will also pass the criteria for SW-846, Third Edition, which is the EPA standard for allowing wastes to be treated as non-hazardous waste. Dyes and pigments do not affect the ability of nylon spunbond fabrics to absorb oil and to remove oil sheen from the top of water.

Strong fabrics that absorb oil or that separate oil from water can be used to fabricate articles that absorb oil from water and remove oil sheen on top of water. In one embodiment, a strong nonwoven fabric made of a single layer used by itself or as a layer in an article can be used to absorb oil from water and remove oil sheen on top of water. In an embodiment, the fabric has a basis weight of about 3 osy as measured using American Society for Testing and Materials test method (ASTM) D3776, thickness of about 19 mils as measured using ASTM D1777, machine direction grab tensile strength of at least about 115 lbs$_f$ as measured using ASTM D5034, machine direction grab elongation of about 84% as measured using ASTM D5034, cross direction grab tensile strength of at least about 86 lbs$_f$ as measured using ASTM D5034, cross direction grab elongation of about 94% as measured using ASTM D5034, machine direction trapezoidal tear strength of at least about 35 lbs$_f$ as measured by ASTM D5587, cross direction trapezoidal tear strength of at least about 24 lbs$_f$ as measured by ASTM D5587, air permeability of about 190 ft$^3$/min/ft$^2$ as measured by ASTM D737, a burst strength of at least about 79.3 pounds per square inch (PSI) as measured by ASTM D3786, a mean pore size of about 34.1 microns, retention of at least about 87% of its machine direction grab strength as measured using ASTM D5034 when exposed to a xenon light source for 1000 hours, continuous nylon filaments, and wicks oil and water. This fabric will also pass the criteria for SW-846, Third Edition which is the EPA standard for allowing wastes to be treated as non-hazardous waste.

Other polymers or combination of polymers including but not limited to polyester and polypropylene can be used to make a similar fabric. The fabric can be made from filaments that comprise more than one polymer such as bicomponent or tricomponent filaments. The fabric can be thermally bonded with the pattern illustrated in U.S. Pat. No. 2,163,116. This particular fabric is sold under the trademarks PBN-II® and OIL SHARK® and is available from Cerex Advanced Fabrics, Inc. According to many embodiments of the subject invention, a thermally bonded fabric can be bonded over about 17% to 25% of the fabric area. Other patterns can be used. Examples of fabrics that can be used with other patterns are a diamond patterned fabric sold under the trademarks ORION® and OIL SHARK® available from Cerex Advanced Fabrics, Inc. and a herringbone patterned fabric sold under the trademarks SPECTRAMAX® and OIL SHARK® available from Cerex Advanced Fabrics, Inc.

A nonwoven fabric by itself or to make articles that absorb oil from water or remove oil sheen from water can have a flux rate, or function to filter water with a flux rate, as measured by ASTM D5141, of, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in gallons per minute per square foot (gpm/ft$^2$)): 0.01, 0.02, 0.03, 0.04, 0.05, 0.06, 0.07, 0.1, 0.2, 0.3, 0.4, 0.5, 0.6, 0.7, 0.8, 0.9, 0.91, 0.92, 0.93, 0.94, 0.95, 0.96, 0.97, 0.98, 0.99, 1.0, 1.05, 1.10, 1.15, 1.19, 1.20, 1.21, 1.25, 1.3, 1.4, 1.5, 1.75, 2.0, 2.5, 3.0, 3.5, 4.0, 5, 6, 7, 8, 9, 10, 15, 20, 25, or 30. For example, a nonwoven fabric can have can have a flux rate, or function to filter water with a flux rate, as measured by ASTM D5141, of 0.91 gpm/ft$^2$, about 0.91 gpm/ft$^2$, 0.94 gpm/ft$^2$, about 0.94 gpm/ft$^2$, 0.96 gpm/ft$^2$, about 0.96 gpm/ft$^2$, 1.2 gpm/ft$^2$, or about 1.2 gpm/ft$^2$. In particular embodiments, a nonwoven fabric can have can have a flux rate, or function to filter water with a flux rate, as measured by ASTM D5141, of at least 0.91 gpm/ft$^2$, at least 0.94 gpm/ft$^2$, at least 0.96 gpm/ft$^2$, or at least 1.2 gpm/ft$^2$.

A nonwoven fabric used by itself or as a layer in an article can have a filter efficiency (e.g., as measured by ASTM D5141) of, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values given are in %): 5, 10, 15, 20, 25, 30, 35, 40, 45, 50, 55, 60, 65, 70, 75, 80, 85, 86, 90, 91, 92, 93, 94, 95, 96, 97, 98, 99, 99.1, 99.2, 99.3, 99.4, 99.5, 99.6, 99.7, 99.8, 99.9, 99.91, 99.92, 99.93, 99.94, 99.95, 99.96, 99.97, 99.98, 99.99, or 100. For example, a nonwoven fabric can have filter efficiency, as measured by ASTM D5141, of 99%, about 99%, at least 99%, 99.1%, about 99.1%, at least 99.1%, 99.3%, about 99.3%, at least 99.3%, 99.5%, about 99.5%, or at least 99.5%. In a particular embodiment, a nonwoven fabric can have filter efficiency, as measured by ASTM D5141, of at least 99%. A nonwoven fabric can have a filter efficiency as measured by ASTM D5141, of any of the following values or ranges as discussed in this paragraph even when filtering fluid (e.g., water) at a flux rate of any of the values or ranges as discussed in the previous paragraph (e.g., at least 0.91 gpm/ft$^2$, at least 0.94 gpm/ft$^2$, at least 0.96 gpm/ft$^2$, or at least 1.2 gpm/ft$^2$). The protocol for ASTM D5141 used to measure the filter efficiency and flux rate is described in detail in a publication by Wolfe et al. (Wolfe, K. B. and Peters, J. L., Qualitative Valuation of Performance Testing for Sediment Retention Devices, International Erosion Control Association, http://www.ieca.org/membersonly/cms/content/Proceedings/Object463PDF English.pdf), which is hereby incorporated by reference in its entirety.

An article, such as a sock (e.g., a sediment sock or an absorbent sock), can be fabricated by stuffing a sleeve made from fabric comprised of synthetic fiber. The sleeve can be made from various types of fabric as long as the fabric that is selected does not allow migration of the fiber used to fill the tube. Such fabrics can include nylon, polyester, polypropylene, or any combination thereof, though embodiments are not limited thereto. Such fabrics can be woven fabrics, nonwoven fabrics, wet or dry laid fabrics, knit fabrics or spunbond fabrics, though embodiments are not limited thereto. Spunbond fabrics have a particular advantage in that they are made from continuous filaments, are relatively inexpensive and will not unravel when cut. For example, a fabric that can be used to make a sleeve can be a nylon spunbond fabric, a polyester spunbond fabric, or a polypropylene spunbond fabric, or a spunbond fabric made from a combination of at least two of nylon, polyester, and polypropylene. Such fabrics can be made of a mixture of filaments of different polymers or bicomponent fibers or multicomponent fibers.

A nonwoven fabric used to make a non-linting sock (e.g., a sediment sock or an absorbent sock) can have a basis weight of, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in ounces per square yard (osy)): 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5, 5.5, 6, 6.5, 7, 7.5, 8, 8.5, 9, 9.5, 10, 11, 12, 13, 14, 15, 16, 17, 18, 19, 20, 25, 30, 35, 40, 45, or 50. For example, a nonwoven fabric can have a basis weight of 0.7 osy, 0.85 osy, 1 osy, 2 osy, 3 osy, 3.1 osy, 4 osy, about 0.85 osy, about 1 osy, about 2 osy, about 3 osy, about 3.1 osy, or about 4 osy. In particular embodiments, a nonwoven fabric can have a basis weight of no more than 4 osy, no more than 3.1 osy, no more than 3 osy, or no more than 0.85 osy. In other embodiments, a nonwoven fabric can have a basis weight of at least 4 osy, at least 3.1 osy, at least 3 osy, or at least 0.85 osy.

A nonwoven fabric used to make a non-linting sock (e.g., a sediment sock or an absorbent sock) can have a mean pore size of, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in microns): 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 28.2, 29, 30, 31, 32, 33, 34, 35, 36, 37, 38, 39, 40, 41, 45, 50, 55, 60, 65, 70, 75, 80, 85, 90, 95, 100, 110, 120, 130, 140, 150, 160, 170, 180, 190, or 200. For example, a nonwoven fabric can have a mean pore size of 28.2 microns, about 28.2 microns, at least 28.2 microns, no more than 28.2 microns, 31 microns, about 31 microns, at least 31 microns, no more than 31 microns, or no more than 41 microns.

Mean pore size can be measured by any suitable method known in the art. For example, the mean pore size can be measured using an instrument as discussed in a publication by Jena et al. (Jena, A. and Gupta, K., Advances in Pore Structure Evaluation by Porometry, Porous Materials Inc., http://www.pmiapp.com/publications/docs/Review-Papers/Advances-in-P-ore-Structure-Evaluation-by-Porometry.pdf), which is hereby incorporated by reference in its entirety.

In certain embodiments, nonwoven fabrics used to make a non-linting socks (e.g., sediment socks or absorbent socks) can have product enhancements. Enhancements include one or more of the following: color, colorfastness, antimicrobial capability, antifungal capability, ultraviolet (UV) degradation resistance, light degradation resistance, strength retention when weathered, water repellency, oil adsorption, oil absorption, water permeability, and retention capability of solids such as silt, clay and soil; though embodiments are not limited thereto.

Dyes or other materials that impart high visibility colors (e.g., orange and red) commonly include hazardous materials, for example metals such as hexavalent chromium and/or lead. Only a few materials exist that that can impart high visibility colors, do not contain these hazardous materials, and can tolerate the high temperatures required in processing polymer pellets into fabrics. In certain embodiments, a nonwoven fabric used to make non-linting socks (e.g., sediment socks or absorbent socks) as described herein can include one or more dyes or other materials, thereby resulting in a nonwoven fabric with a high visibility color (e.g., orange or red). Such a dye or other material does not contain hazardous materials, such as hexavalent chromium or lead. After scouring, this fabric will pass after the criteria for NSF/ANSI Standard 61 (can be found at www.nsf.org), which is the nationally (in the United States) recognized health standard for all devices, components, and materials that contact drinking water. This fabric will also pass the criteria for SW-846, which is the EPA standard for allowing wastes to be treated as non-hazardous waste.

A nonwoven fabric used to make a non-linting sock (e.g., a sediment sock or an absorbent sock) can have a flux rate, or function to filter water with a flux rate, as measured by ASTM D5141, of, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in gallons per minute per square foot (gpm/ft.$^2$)): 0.01, 0.02, 0.03, 0.04, 0.05, 0.06, 0.07, 0.1, 0.2, 0.3, 0.4, 0.5, 0.6, 0.7, 0.8, 0.9, 0.91, 0.92, 0.93, 0.94, 0.95, 0.96, 0.97, 0.98, 0.99, 1.0, 1.05, 1.10, 1.15, 1.19, 1.20, 1.21, 1.25, 1.3, 1.4, 1.5, 1.75, 2.0, 2.5, 3.0, 3.5, 4.0, 5, 6, 7, 8, 9, 10, 15, 20, 25, or 30. For example, a nonwoven fabric can have a flux rate, or function to filter water with a flux rate, as measured by ASTM D5141, of 0.91 gpm/ft.$^2$, about 0.91 gpm/ft.$^2$, 0.94 gpm/ft.$^2$, about 0.94 gpm/ft.$^2$, 0.96 gpm/ft.$^2$, about 0.96 gpm/ft.$^2$, 1.2 gpm/ft.$^2$, or about 1.2 gpm/ft.$^2$. In particular embodiments, a nonwoven fabric can have can have a flux rate, or function to filter water with a flux rate, as measured by ASTM D5141, of at least 0.91 gpm/ft.$^2$, at least 0.94 gpm/ft.$^2$, at least gpm/ft.$^2$ or at least 1.2 gpm/ft.$^2$.

A nonwoven fabric used to make non-linting socks (e.g., sediment socks or absorbent socks) can have a filter efficiency (e.g., as measured by ASTM D5141) of, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values given are in %): 5, 10, 15, 20, 25, 30, 35, 40, 45, 50, 55, 60, 65, 70, 75, 80, 85, 86, 90, 91, 92, 93, 94, 95, 96, 97, 98, 99, 99.1, 99.2, 99.3, 99.4, 99.5, 99.6, 99.7, 99.8, 99.9, 99.91, 99.92, 99.93, 99.94, 99.95, 99.96, 99.97, 99.98, 99.99, or 100. For example, a nonwoven fabric can have filter efficiency, as measured by ASTM D5141, of 99%, about 99%, at least 99%, 99.1%, about 99.1%, at least 99.1%, 99.3%, about 99.3%, at least 99.3%, 99.5%, about 99.5%, or at least 99.5%. In a particular embodiment, a nonwoven fabric can have filter efficiency, as measured by ASTM D5141, of at least 99%. A nonwoven fabric can have a filter efficiency, as measured by ASTM D5141, of any of the following values or ranges as discussed in this paragraph even when filtering fluid (e.g., water) at a flux rate of any of the values or ranges as discussed in the previous paragraph (e.g., at least 0.91 gpm/ft.$^2$, at least 0.94 gpm/ft.$^2$, at least 0.96 gpm/ft.$^2$, or at least 1.2 gpm/ft.$^2$).

The protocol for ASTM D5141 used to measure the filter efficiency and flux rate is described in detail in a publication by Wolfe et al. (Wolfe, K. B. and Peters, J. L., Qualitative Valuation of Performance Testing for Sediment Retention Devices, International Erosion Control Association, http://www.ieca.org/membersonly/cms/content/Proceedings/Object463PDFEnglish.pdf), which is hereby incorporated by reference in its entirety.

In many embodiments, a sock (e.g., a sediment sock or an absorbent sock) can be made with a nonwoven fabric as the outer sleeve of about any diameter desired. A sock (e.g., a sediment sock or an absorbent sock) can have a diameter of, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in inches): 0.1, 0.2, 0.3, 0.4, 0.5, 0.6, 0.7, 0.8, 0.9, 1, 2, 3, 4, 5, 6, 6.5, 7, 8, 8.5, 9, 10, 11, 12, 12.5, 13, 14, 15, 16, 17, 18, 19, 20, 21, 22, 23, 24, 25, 26, 27, 28, 28.2, 29, 30, 31, 32, 33, 34, 35, 36, 37, 38, 39, 40, 41, 45, 50, 55, 60, 65, 70, 75, 80, 85, 90, 95, 100, 110, 120, 130, 140, 150, 160, 170, 180, 190, or 200. For example, a nonwoven fabric can have a diameter of 28.2 inches, about 28.2 inches, at least 28.2 inches, no more than 28.2 inches, 31 inches, about 31 inches, at least 31 inches, no more than 31 inches, or no more than 41 inches.

A sock (e.g., a sediment sock or an absorbent sock) can be made with a nonwoven fabric as the outer sleeve having a machine direction grab tensile strength, as measured using ASTM D5034, of, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in pounds force (lb$_f$): 1, 2, 3, 4, 5, 6, 7, 8, 9, 10, 11, 12, 13, 14, 15, 16, 17, 18, 19, 19.6, 20, 20.8, 21, 21.1, 21.8, 21.9, 22, 22.45, 23, 24, 25, 26, 27, 28, 29, 30, 35, 40, 45, 50, 55, 60, 65, 70, 75, 80, 85, 90, 95, 100, 105, 110, 115, 120, 125, 130, 132, 135, 140, 145, 150, 155, 157, 160, 165, 170, 175, 180, 185, 190, 195, 200, 225, 250, 275, 300, 350, 400, 450, 500, 550, 600, 650, 700, 750, 800, 850, 900, 950, 1000, 1100, 1200, 1300, 1400, 1500, or 2000. For example, a nonwoven fabric can have a machine direction grab tensile strength, as measured using ASTM D5034, of about 1 lb$_f$, about 2 lb$_f$, or about 3 lb$_f$. In particular embodiments, a nonwoven fabric can have a machine direction grab tensile strength, as measured using ASTM D5034, of at least 3.6 lb$_f$, at least 12 lb$_f$, at least 15.5 lb$_f$, at least 70 lb$_f$, or at least 73 lb$_f$. In a preferred embodiment, a fabric has a basis weight of about 0.5 osy as measured by ASTM test method D3776, thickness of about 5.9 mils as measured using ASTM D1777, machine direction grab tensile strength of at least about 12 lb$_f$ as measured using ASTM D5034, machine direction grab elongation of about 60% as measured using ASTM D5034, cross direction grab tensile strength of at least about 7.6 lb$_f$ as measured using ASTM D5034, cross direction grab elongation of about 63% as measured using ASTM D5034, machine direction trapezoidal tear strength of at least about 4.4 lb$_f$ as measured by ASTM D5587, cross direction trapezoidal tear strength of at least about 2.8 lb$_f$ measured by ASTM D5587, a burst strength of at least about 13 lb/in$^2$ as measured by ASTM D3786, a mean pore size of about 120 microns, and an air permeability of about 1516 ft$^3$/min/ft$^2$ as measured by ASTM D737.

In a particular embodiment, a strong nonwoven fabric can be used to make a non-linting sock (e.g., a sediment sock or an absorbent sock). The nonwoven fabric can have a basis weight of 4 ounces per square yard, a thickness of about 22.3 mils, a machine direction grab tensile strength of about 157 lb$_f$ as measured using ASTM D5034, a machine direction grab elongation of about 91% as measured using ASTM D5034, a cross direction grab tensile strength of about 119 lb$_f$ as measured using ASTM D5034, a cross direction grab elongation of about 100% as measured using ASTM D5034, a machine direction trapezoidal tear strength of at least about 49 lb$_f$ as measured by ASTM D5587, a cross direction trapezoidal tear strength of at least about 34.2 lb$_f$ measured by ASTM D5587, air permeability of at least about 125 cubic feet per minute per square foot as measured by ASTM D737, retention of at least about 87% of its machine direction grab strength as measured using ASTM D5034 when exposed to a xenon light source for 1000 hours, continuous nylon filaments, and absorption of at least about twice its weight in oil having a viscosity of about 320 centipoises. Additionally, the fabric can have a machine direction grab tensile strength of about 174 lb$_f$ as measured using ASTM D4632, a machine direction grab elongation of about 115% as measured using ASTM D4632, a cross direction grab tensile strength of about 126 lb$_f$ as measured using ASTM D4632, a cross direction grab elongation of about 112% as measured using ASTM D4632, a mean pore size of about 31 microns, a filter efficiency of at least 99% (e.g., 99.1%, 99.3%, 99.5%) as measured by ASTM D5141. The fabric can have a flux rate, or function to filter water with a flux rate, of at least 0.91 gallons per minute per square foot as measured by ASTM D5141. The fabric can have a filter efficiency of at least 99% as measured by ASTM D5141 when filtering water at a flux rate of at least 0.91 gallons per minute per square foot as measured by ASTM D5141. The density of this fabric can be 0.234 grams per cubic centimeter.

In a preferred embodiment the sleeve can be made using a spunbond nylon fabric, Oil Shark® SK100, commercially available from Cerex Advanced Fabrics, Inc. in Cantonment, Fla., that has a basis weight of 1.0 osy as measured by ASTM test method D3776, thickness of about 9.3 mils as measured using ASTM D1777, machine direction grab tensile strength of at least about 29.9 lb$_f$ as measured using ASTM D5034, machine direction grab elongation of about 69% as measured using ASTM D5034, cross direction grab tensile strength of at least about 20.9 lb$_f$ as measured using ASTM D5034, cross direction grab elongation of about 75% as measured using ASTM D5034, machine direction trapezoidal tear strength of at least about 10.5 lb$_f$ as measured by ASTM D5587, cross direction trapezoidal tear strength of at least about 6.5 lb$_f$ measured by ASTM D5587, a burst strength of at least about 24 lb/in² as measured by ASTM D3786, a mean pore size of about 57.4 microns, air permeability of about 774 ft³/min/ft² as measured by ASTM D737, continuous nylon filaments, and wicks oil and water. This fabric will also pass the criteria for SW-846, Third Edition which is the EPA standard for allowing wastes to be treated as non-hazardous waste. This allows for easy disposal of the fabric. The nylon fabric can be thermally bonded with the pattern illustrated in U.S. Pat. No. 2,163,116. This fabric is sold under the trademarks PBN-II® and OIL SHARK® and is available from Cerex Advanced Fabrics, Inc. This fabric will not unravel when cut or deployed. This fabric will also remove oil sheen from water. Oil sheen on water is defined as oil on top of water that settles as a thin film layer that causes the thin layer to shimmer because of an optical phenomenon called interference. The shimmering can be in different colors. Other patterns can be used. Examples of fabrics that can be used with other patterns are a diamond patterned fabric sold under the trademarks ORION® and OIL SHARK® available from Cerex Advanced Fabrics, Inc. and a herringbone patterned fabric sold under the trademarks SPECTRAMAX® and OIL SHARK® available from Cerex Advanced Fabrics, Inc. Other polymers or combination of polymers can be used to make the fabric including but not limited to polyester and polypropylene.

In another embodiment the sleeve can be made using a spunbond nylon fabric that has a basis weight of 2 osy as measured by ASTM test method D3776, thickness of about 15 mils as measured using ASTM D1777, machine direction grab tensile strength of at least about 70 $lb_f$ as measured using ASTM D5034, machine direction grab elongation of about 80% as measured using ASTM D5034, cross direction grab tensile strength of at least about 50 $lb_f$ as measured using ASTM D5034, cross direction grab elongation of about 89% as measured using ASTM D5034, machine direction trapezoidal tear strength of at least about 23 $lb_f$ as measured by ASTM D5587, cross direction trapezoidal tear strength of at least about 15 $lb_f$ measured by ASTM D5587, a burst strength of at least about 51 lbs/in² as measured by ASTM D3786, a mean pore size of about 43 microns, air permeability of about 353 ft³/min/ft² as measured by ASTM D737, continuous nylon filaments and wicks oil and water. This fabric passes the criteria for SW-846, Third Edition, which is the EPA standard for allowing wastes to be treated as non-hazardous waste. This allows for easy disposal of the fabric. This fabric is a thermally bonded nylon nonwoven commercially available from Cerex Advanced Fabrics in Cantonment, Fla. under the trademarks Oil Shark® and PBN-II®. This fabric will not unravel when cut or deployed. This fabric will also remove oil sheen from water. Oil sheen on water is defined as oil on top of water that settles as a thin film layer that causes the thin layer to shimmer because of an optical phenomenon called interference. The shimmering can be in different colors.

In yet another embodiment the spunbond fabric can have a basis weight of 4 ounces per square yard, a thickness of about 22.3 mils, a machine direction grab tensile strength of about 157 pounds force as measured using ASTM D5034, a machine direction grab elongation of about 91% as measured using ASTM D5034, a cross direction grab tensile strength of about 119 pounds force as measured using ASTM D5034, a cross direction grab elongation of about 100% as measured using ASTM D5034, a machine direction trapezoidal tear strength of at least about 49 pounds force as measured by ASTM D5587, a cross direction trapezoidal tear strength of at least about 34.2 pounds force measured by ASTM D5587, air permeability of at least about 125 cubic feet per minute per square foot as measured by ASTM D737, retention of at least about 87% of its machine direction grab strength as measured using ASTM D5034 when exposed to a xenon light source for 1000 hours, continuous nylon filaments, and absorption of at least about twice its weight in oil having a viscosity of about 320 centipoises.

Other polymers can be used to make the fabric including but not limited to polyester and polypropylene. The fabric can be thermally bonded with the pattern illustrated in U.S. Pat. No. 2,163,116. This fabric is sold under the trademarks PBN-II® and OIL SHARK® and is available from Cerex Advanced Fabrics, Inc. Other patterns can be used. Examples of fabrics that can be used with other patterns are a diamond-patterned fabric sold under the trademarks ORION® and OIL SHARK® available from Cerex Advanced Fabrics, Inc. and a herringbone-patterned fabric sold under the trademarks SPECTRAMAX® and OIL SHARK® available from Cerex Advanced Fabrics, Inc.

In yet another embodiment, a fabric can be used to make the sleeve that has a basis weight of 2 osy as measured by ASTM test method D3776, thickness of about 8.4 mils as measured using ASTM D1777, machine direction grab tensile strength of at least about 73 $lb_f$ as measured using ASTM D5034, machine direction grab elongation of about 60% as measured using ASTM D5034, cross direction grab tensile strength of at least about 47 $lb_f$ as measured using ASTM D5034, cross direction grab elongation of about 64% as measured using ASTM D5034, machine direction trapezoidal tear strength of at least about 15 $lb_f$ as measured by ASTM D5587, cross direction trapezoidal tear strength of at least about 9.9 $lb_f$ measured by ASTM D5587, a burst strength of at least about 67 lb/in² as measured by ASTM D3786, a mean pore size of about 28.9 microns, air permeability of about 170 ft³/min/ft² as measured by ASTM D737, continuous nylon filaments, and wicks oil and water. The fabric is chemically bonded as described in U.S. Pat. No. 3,516,900 and U.S. Pat. No. 4,168,195. The surface of this fabric is smooth with no point bonds. This fabric will not unravel when cut or deployed.

Sleeves can be made from a fabric that has a basis weight of, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in ounces per square yard (osy)): 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5, 5.5, 6, 6.5, 7, 7.5, 8, 8.5, 9, 9.5, 10, 11, 12, 13, 14, 15, 16, 17, 18, 19, 20, 25, 30, 35, 40, 45, or 50.

Measurements were conducted to define the sorption behavior of commercially available nylon spunbond fabrics. The fabric used in this study was Type SK, OIL SHARK® nylon spunbond fabric. This fabric is comprised of four denier per filament nylon fibers. Eleven fabrics of different basis weights were sampled by cutting three inch square specimens and weighing them before and after soaking them in crude oil of about 2 centistokes viscosity. The crude oil was obtained from a well in Louisiana and is commonly referred to as Louisiana sweet crude oil. The gear lube oil is Mobil® Spartan® EP320 Gear Lube Oil. The sorption of crude oil by nylon spunbond fabrics was determined by cutting twenty-two specimens that were three inches square. Two specimens were selected for each of eleven basis weights. These specimens were weighed before and after soaking them in crude oil. The amount of oil sorbed was then calculated from the weights and the percent of crude oil sorbed using the weight of the specimen prior to soaking it in oil as the base. Table 5 lists the results.

TABLE 5

Sorption of crude oil of fabrics of various basis weights

| Type | Basis Weight (osy) | % Crude oil sorbed/ weight of nylon fabric |
| --- | --- | --- |
| SK300 | 2.94 | 296% |
| SK030 | 0.37 | 1079% |
| SK150 | 1.53 | 525% |
| SK040 | 0.36 | 1627% |
| SK200 | 2.16 | 441% |
| SK100 | 0.88 | 719% |
| SK085 | 0.88 | 771% |
| SK240 | 2.63 | 323% |
| SK050 | 0.48 | 987% |
| SK400 | 3.74 | 305% |
| SK070 | 0.60 | 1118% |
| SK300 | 3.10 | 356% |
| SK030 | 0.31 | 1417% |
| SK150 | 1.48 | 581% |
| SK040 | 0.42 | 1332% |
| SK200 | 2.02 | 489% |
| SK100 | 0.96 | 743% |
| SK085 | 0.86 | 839% |
| SK240 | 2.47 | 403% |
| SK050 | 0.49 | 1126% |
| SK400 | 3.77 | 352% |
| SK070 | 0.75 | 905% |

Similarly, the sorption of 320 centistokes gear lube oil by nylon spunbond fabrics was determined by cutting three or four specimens for selected basis weights that were two or three inches square. The gear lube oil is Mobil® Spartan® EP320 Gear Lube Oil. Three, four or seven specimens were selected for each of seven basis weights. As previously described, these specimens were weighed before and after soaking them in this oil and then the amount of oil sorbed was calculated from the weights and the percent of 320 centistokes oil sorbed. Table 6 shows the results.

TABLE 6

Sorption of 320 cStokes oil of fabrics of various basis weights

| Type | Basis Weight (osy) | % 320 centistokes oil sorbed/ weight of nylon fabric |
| --- | --- | --- |
| SK030 | 0.36 | 2317% |
| SK030 | 0.35 | 2605% |
| SK030 | 0.37 | 2474% |
| SK030 | 0.29 | 2645% |
| SK050 | 0.56 | 2351% |
| SK050 | 0.42 | 1788% |
| SK050 | 0.58 | 1875% |
| SK060 | 0.67 | 1655% |
| SK060 | 0.67 | 1541% |
| SK060 | 0.59 | 1797% |
| SK085 | 0.74 | 1578% |
| SK085 | 0.82 | 1429% |
| SK085 | 0.79 | 1483% |
| SK100 | 0.99 | 1345% |
| SK100 | 0.84 | 1390% |
| SK100 | 0.98 | 1278% |
| SK150 | 1.68 | 895% |
| SK150 | 1.52 | 958% |
| SK150 | 1.69 | 895% |
| SK150 | 1.81 | 844% |

TABLE 6-continued

Sorption of 320 cStokes oil of fabrics of various basis weights

| Type | Basis Weight (osy) | % 320 centistokes oil sorbed/ weight of nylon fabric |
| --- | --- | --- |
| SK200 | 2.05 | 782% |
| SK200 | 2.04 | 860% |
| SK200 | 2.19 | 819% |
| SK200 | 2.15 | 788% |
| SK100 | 1.01 | 1437% |
| SK100 | 1.10 | 1351% |
| SK100 | 1.12 | 1381% |

In many embodiments, a nonwoven fabric used to make a non-linting sock (e.g., a sediment sock or an absorbent sock) can have absorption of at least about twice its weight in oil. In various embodiments, a nonwoven fabric used to make a non-linting sock (e.g., a sediment sock or an absorbent sock) can have absorption of at least two times (×), at least 1.0×, at least 1.1×, at least 1.2×, at least 1.3×, at least 1.4×, at least 1.5×, at least 1.6×, at least 1.7×, at least 1.8×, at least 1.9×, at least 2.1×, at least 2.2×, at least 2.3×, at least 2.4×, at least 2.5×, at least 3×, at least 4×, at least 5×, at least 6×, at least 7×, at least 8×, at least 9×, at least 10×, at least 11×, at least 12×, at least 13×, at least 14×, at least 15×, or more of its own body weight in oil. The viscosity for the oil for which the fabric can absorb these amounts can be for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values given are in centipoise (cp)): 50, 100, 150, 200, 250, 300, 320, 350, 400, 450, 500, 550, or 600. For example, a nonwoven fabric used to make a non-linting sock (e.g., a sediment sock or an absorbent sock) can have absorption of at least about twice its weight in oil having a viscosity of about 320 cp.

A non-linting sock (e.g., a sediment sock or an absorbent sock) can be fabricated using any of the sleeves described in the previous embodiments by inserting polyester batting or blowing polyester fiber into the sleeve. Batting of various basis weights or thicknesses can be inserted into this sleeve and seamed shut on both ends. In another embodiment, polyester fiber can be blown into the sleeve and sewn shut on both ends with a surged seam. In a specific embodiments, polyester batting or polyester fiber made from recycled bottles with fibers of two melt points are inserted or blown into the sleeve. Other polymers or combination of polymers can be used to make the batting including but not limited to polyester and polypropylene. Bicomponent and multi component fibers can be used to make the batting. Blends of different melt point polymers can also be used.

Needle punched reclaimed carpet fibers as described in U.S. Pat. No. 6,422,787 can also be inserted into this sleeve. One skilled in the art will realize that many different materials can be used to fill a sleeve. Socks (e.g., sediment socks or absorbent socks) made using fabric in the disclosed embodiments will not release lint or fibers into the environment.

In an embodiment, 48 ounces of polyester fiber can be blown into a twelve inch diameter sleeve that is 45 inches long made of 1 osy nylon spunbond fabric. The nylon spunbond fabric is commercially available from Cerex Advanced Fabrics, Inc. in Cantonment, Fla. under the trade names PBN-II® and OIL SHARK®. After filling the sleeve, the ends are then secured by a variety of methods including but not limited to seaming, surge seaming, stapling, clipping or using wire ties.

In another embodiment, 48 ounces of polyester fiber can be blown into twelve inch diameter sleeve that is 45 inches long made of 4 osy nylon spunbond fabric. The nylon spunbond fabric is commercially available from Cerex Advanced Fabrics, Inc. in Cantonment, Fla. under the trade names PBN-II® and OIL SHARK®. After filling the sleeve, the ends are then secured by a variety of methods including but not limited to seaming, surge seaming, stapling, clipping or using wire ties. These sediment socks can be deployed in the field by driving a stake through them and securing the stake to the ground.

In a specific embodiment, 48 ounces of polyester fiber can be blown into a twelve inch diameter sleeve that is 45 inches long made of 1 osy nylon spunbond fabric. The nylon spunbond fabric is commercially available from Cerex Advanced Fabrics, Inc. in Cantonment, Fla. under the trade names PBN-II® and OIL SHARK®. After filling the sleeve, the ends are then secured with a surged seam on both ends. The fabric can be slit to accommodate a stake to secure the sediment sock to the ground.

In another specific embodiment, 48 ounces of polyester fiber can be blown into a twelve inch diameter sleeve that is 45 inches long made of 1 osy nylon spunbond fabric. The nylon spunbond fabric is commercially available from Cerex Advanced Fabrics, Inc. in Cantonment, Fla. under the trade names PBN-II® and OIL SHARK®. After filling the sleeve, the ends are then secured with a surged seam on both ends. One or more holes can be punched into the sediment sock to accommodate a stake to secure the sediment sock to the ground.

EXEMPLIFIED EMBODIMENTS

The invention includes, but is not limited to, the following embodiments:

Embodiment 1

An article that absorbs more than 15 times its dry weight in oil that has a viscosity of 320 centistokes.

Embodiment 2

The article of embodiment 1 that is made up of more than one layer of fabric.

Embodiment 3

An oil-absorbing article that removes oil sheen on water.

Embodiment 4

The article of embodiment 3 that absorbs more than 15 times its dry weight in oil that has a viscosity of 320 centistokes.

Embodiment 5

The article of any of embodiments 1-4 that is comprised of two porous outer fabric layers and is filled with absorbent batting made from at least 30% man made materials.

Embodiment 6

The article of any of embodiments 1-5, wherein the outer layer has a basis weight of 0.3 ounces per square yard (osy) to 2.9 osy.

Embodiment 7

The article of any of embodiments 1-6, wherein the batting has a basis weight between 0.5 osy to 11 osy.

Embodiment 8

The article of any of embodiments 1-7 that is comprised of at least 30% recycled material.

Embodiment 9

The article of any of embodiments 1-8, wherein the batting layer is made from nylon, polyester, polybutylene terephthalate, polypropylene, cotton, polyethylene or any combination of these materials.

Embodiment 10

The article of any of embodiments 1-9, wherein the outer layer is made from nylon, polyester, polybutylene terephthalate, polypropylene, cotton, polyethylene or any combination of these materials.

Embodiment 11

The article of any of embodiments 1-10 that has a machine direction grab strength of at least 6.2 pounds force as measured by ASTM D5034.

Embodiment 12

The article of any of embodiments 1-11 that has a cross direction grab strength as measured by ASTM D5034 of at least 3.6 pounds force.

Embodiment 13

The article of any of embodiments 1-12 that has a thickness as measured with a caliper of at least 0.5 inches.

Embodiment 14

The article of any of embodiments 2, 3, and 4-13 that absorbs at least 14.4 times its dry weight of 320 centistoke oil.

Embodiment 15

The article of any of embodiments 1-14 that has an outer layer with a flux rate as measured by ASTM 5141 of at least 0.5 gpm/ft$^2$.

Embodiment 16

The article of any of embodiments 1-15 that has an outer layer with a filtration efficiency as measured by ASTM 5141 of at least 90%.

Embodiment 17

The article of any of embodiments 1-16 that is black, orange, yellow, red, blue or another color.

Embodiment 18

The article of any of embodiments 1-17 that combines the three layers ultrasonically, sewn or laminated.

Embodiment 19

A method of seaming the article of any of embodiments 1-18 using ultrasonic seaming, thermal seaming, stitch bonding, using radio frequency seaming, gluing or lamination.

Embodiment 20

The article of any of embodiments 2, 3, 4-13, and 15-19 that absorbs more than 14.4 times its dry weight of 320 centistoke oil.

Embodiment 21

An oil-absorbing fabric that removes oil sheen on water.

Embodiment 22

A fabric that removes oil sheen from the surface of water.

Embodiment 23

The fabric of embodiment 22 that will absorb oil and water (i.e., is oleophilic and hydrophilic).

Embodiment 24

The fabric of any of embodiments 22-23, comprising at least one of nylon, polyester, and polypropylene.

Embodiment 25

The fabric of any of embodiments 22-24, wherein the fabric has a basis weight of at least 0.1 osy.

Embodiment 26

The fabric of any of embodiments 22-25, wherein the fabric is capable of absorbing at least 10 times its dry weight in crude oil.

Embodiment 27

The fabric of any of embodiments 22-25, wherein the fabric is capable of absorbing at least 3 times its dry weight in crude oil.

Embodiment 28

The fabric of any of embodiments 22-27, wherein the fabric passes the criteria for SW-846, Third Edition.

Embodiment 29

The fabric of any of embodiments 22-28, wherein the fabric has a machine direction grab tensile strength of at least 3 $lb_f$ (e.g., as measured by ASTM D5034).

Embodiment 30

The fabric of any of embodiments 22-29, wherein the fabric has a thickness of at least 2 mil.

Embodiment 31

An article comprising the fabric of any of embodiments 22-30.

Embodiment 32

The article of embodiment 31, which is a sweep.

Embodiment 33

The article of embodiment 31, which is made from strips of the fabric, wherein the article is a mop, a pom pom, or a snare.

Embodiment 34

The article of embodiment 33, which is a pom pom that weights at least 0.05 pounds.

Embodiment 35

The article of embodiment 31, comprising a plurality of pom poms attached to a rope, a strip of fabric, or any device to connect the pom poms together, wherein each of the pom poms comprises strips of the fabric of any of embodiments 22-30.

Embodiment 36

An article (e.g., a sock such as a sediment sock or an absorbent sock) comprising the fabric of any of embodiments 22-30 as an outer fabric (or outer layer).

Embodiment 37

The article of embodiment 36, further comprising synthetic fibers disposed within the fabric.

Embodiment 38

The article of embodiment 37, wherein the synthetic fibers comprise recycled polymer.

Embodiment 39

The article of any of embodiments 37-38, wherein the synthetic fibers comprise recycled fiber.

Embodiment 40

The article of any of embodiments 37-39, wherein the fabric comprises recycled fiber.

Embodiment 41

The article of any of embodiments 37-40, which is a sock (e.g., a sediment sock or an absorbent sock) that does not lint.

Embodiment 42

The article of any of embodiments 37-41, wherein the fabric has a machine direction grab tensile strength of at least 12 lb$_f$ (e.g., as measured by ASTM D5034).

Embodiment 43

The article of any of embodiments 37-42, wherein the fabric has a basis weight of at least 0.3 osy.

Embodiment 44

The article of any of embodiments 37-43, wherein the article has a flux rate of at least 0.9 gallons per minute per square foot.

Embodiment 45

The article of any of embodiments 37-44, wherein the fabric is capable of absorbing at least 2 times its dry weight of oil that has a viscosity of 320 centiStokes.

Embodiment 46

The article of any of embodiments 37-45, wherein the fabric comprises at least one of nylon, polyester, and polypropylene.

Embodiment 47

The article of any of embodiments 37-46, wherein the fabric has a filter efficiency of at least 85% (e.g., as measured by ASTM D5141).

Embodiment 48

The article of any of embodiments 37-47, wherein the fabric will not unravel when cut or deployed.

Embodiment 49

The article of any of embodiments 37-48, wherein the fabric is colored (e.g., by dye).

Embodiment 50

The article of any of embodiments 37-49, wherein the fabric passes the criteria for SW-846, Third Edition.

Following are examples that illustrate procedures for practicing the invention. These examples should not be construed as limiting.

Example 1

A snare was made as per the specifications in Table 7 below using 0.5 osy Type 30 Oil Shark® fabric.

TABLE 7

Specification for OIL SHARK ® snares

| Property | Units | Target | Minimum | Maximum |
|---|---|---|---|---|
| Polymer Type | | Polyamide 6,6 | N/A | N/A |
| Cerex Advanced Fabrics, Inc. Product Style | | 30050 | N/A | N/A |
| Snare total length | feet | 50 | 49 | 51 |
| Pom pom weight | pounds | 0.2 | 0.17 | 0.45 |
| Length of pom pom when pulled straight | inches | 22 | 20 | 24 |
| Distance between pom poms | inches | 20 | 18 | 22 |
| Length of rope or cord at each end | inches | 20 | 18 | 22 |
| Rope or cord diameter | inches | 3/8 | 1/4 | 1/2 |

Pom poms should be securely fastened to the rope or cord so that they do not slide.

Example 2

A snare was made as per the specifications in Table 8 below using 0.5 osy Type 30 Oil Shark® fabric.

TABLE 8

Specification for OIL SHARK ® snares

| Property | Units | Target | Minimum | Maximum |
|---|---|---|---|---|
| Polymer Type | | Polyamide 6,6 | N/A | N/A |
| Cerex Advanced Fabrics, Inc. Product Style | | 30050 | N/A | N/A |
| Snare total length | feet | 50 | 49 | 51 |
| Pom pom weight | pounds | 0.5 | 0.17 | 0.45 |
| Length of pom pom when pulled straight | inches | 22 | 20 | 24 |
| Distance between pom poms | inches | 20 | 18 | 22 |
| Length of rope or cord at each end | inches | 20 | 18 | 22 |
| Rope or cord diameter | inches | 3/8 | 1/4 | 1/2 |

Pom poms should be securely fastened to the rope or cord so that they do not slide.

Example 3

A snare can be made as per the specifications in Table 9 below using 0.5 osy Type 30 Oil Shark® fabric.

TABLE 9

Specification for OIL SHARK ® snares

| Property | Units | Target | Minimum | Maximum |
|---|---|---|---|---|
| Polymer Type | | Polyamide 6,6 | N/A | N/A |
| Cerex Advanced Fabrics, Inc. Product Style | | 30050 | N/A | N/A |
| Snare total length | feet | 50 | 49 | 51 |
| Pom pom weight | pounds | 1 | 0.17 | 0.45 |
| Length of pom pom when pulled straight | inches | 22 | 20 | 24 |
| Distance between pom poms | inches | 20 | 18 | 22 |
| Length of rope or cord at each end | inches | 20 | 18 | 22 |
| Rope or cord diameter | inches | 3/8 | 1/4 | 1/2 |

Pom poms should be securely fastened to the rope or cord so that they do not slide.

Example 4

An article can be made as per the specifications in Table 10 below using 0.5 osy Type 30 Oil Shark® fabric.

TABLE 10

Specification for pom poms on a rope.

| Property | Units | Target | Minimum | Maximum |
|---|---|---|---|---|
| Polymer Type | | Polyamide 6,6 | N/A | N/A |
| Cerex Advanced Fabrics, Inc. Product Style | | 30050 | N/A | N/A |
| Snare total length | feet | 10 | 49 | 51 |
| Pom pom weight | pounds | 0.5 | 0.17 | 0.45 |
| Length of pom pom when pulled straight | inches | 22 | 20 | 24 |
| Distance between pom poms | inches | 7 | 18 | 22 |
| Length of rope or cord at each end | inches | 9 | 18 | 22 |
| Rope or cord diameter | inches | 3/8 | 1/4 | 1/2 |

Pom poms should be securely fastened to the rope or cord so that they do not slide.

Example 5

An article can be made as per the specifications in Table 11 below using 0.5 osy Type 30 Oil Shark® fabric.

TABLE 11

Specification for pom poms on a rope.

| Property | Units | Target | Minimum | Maximum |
|---|---|---|---|---|
| Polymer Type | | Polyamide 6,6 | N/A | N/A |
| Cerex Advanced Fabrics, Inc. Product Style | | 30050 | N/A | N/A |
| Snare total length | feet | 10 | 49 | 51 |
| Pom pom weight | pounds | 1.0 | 0.17 | 0.45 |
| Length of pom pom when pulled straight | inches | 22 | 20 | 24 |
| Distance between pom poms | inches | 7 | 18 | 22 |
| Length of rope or cord at each end | inches | 9 | 18 | 22 |
| Rope or cord diameter | inches | 3/8 | 1/4 | 1/2 |

Pom poms should be securely fastened to the rope or cord so that they do not slide.

Example 6

A sweep was fabricated that was 17 inches wide with a rope running longitudinally in one edge and 100 feet long using 1 osy Oil Shark® fabric type SK100. The rope was installed during sewing on one edge by laying the rope down on the edge of the fabric and folding about 1 inch of fabric over and seaming the rope into the tube that is created from the fold. This sweep was rolled onto a 3 inch paper core. The entire sweep had diameter of about 8 to 8.5 inches. The oil sheen on the surface of water was removed when the sweep was deployed in this water.

Example 7

A snare can be made as per the specifications in Table 12 below using 0.3 osy Type 30 Oil Shark® fabric.

TABLE 12

Specification for OIL SHARK® snares

| Property | Units | Target | Minimum | Maximum |
|---|---|---|---|---|
| Polymer Type | | Polyamide 6,6 | N/A | N/A |
| Cerex Advanced Fabrics, Inc. Product Style | | 30030 | N/A | N/A |
| Snare total length | feet | 50 | 49 | 51 |
| Pom pom weight | pounds | 0.5 | 0.17 | 0.45 |
| Length of pom pom when pulled straight | inches | 22 | 20 | 24 |
| Distance between pom poms | inches | 20 | 18 | 22 |
| Length of rope or cord at each end | inches | 20 | 18 | 22 |
| Rope or cord diameter | inches | 3/8 | 1/4 | 1/2 |

Pom poms should be securely fastened to the rope or cord so that they do not slide.

Example 8

Three small specimens of a polypropylene melt blown fabric that were 2 inches wide and 2 inches long were cut and weighed. This product is commercially available from SpillTech in Mobile, Ala. as Style WPB100H. The basis weight of the specimens is listed in Table 13 along with the dry weight of the specimen. They were then soaked in oil with a viscosity of 320 centistokes. The 320 centistoke oil that was used is commercially available as Mobil® Spartan® EP320 Gear Lube Oil. The weight of each specimen was measured after they were allowed to soak in oil. Table 13 shows the results of the measurements. The average number of times in dry weight of 320 centistoke oil absorbed by the three specimens was 10.9. Grab tensile properties, air permeability, basis weight using, thickness and burst strength were measured on this fabric. The results and test methods of these measurements are shown in Table 14.

TABLE 13

Oil absorbed by polypropylene melt blown fabric WPB100H

| Specimen | Dry Weight (g) | Basis Weight (osy) | Mass of 320 centistoke oil absorbed by specimen (g) | Calculated number of times dry weight oil of 320 centistokes absorbed by specimen |
|---|---|---|---|---|
| 1 | 0.6894 | 7.877 | 9.152 | 13.28 |
| 2 | 0.7985 | 9.124 | 6.893 | 8.63 |
| 3 | 0.7097 | 8.109 | 7.665 | 10.80 |

TABLE 14

Physical properties of polypropylene melt blown fabric WPB100H

| Property | ASTM | Sample Size | Units | Value |
|---|---|---|---|---|
| Basis Weight | D3776 | 4 | osy | 8.90 |
| Thickness | D1777 | 4 | inches | 0.0127 |
| Machine Direction Grab Strength | D5034 | 2 | pounds force | 33.6 |
| Machine Direction Grab Elongation | D5034 | 2 | % | 44.3 |
| Cross Direction Grab Strength | D5034 | 2 | pounds force | 29.2 |
| Cross Direction Grab Elongation | D5034 | 2 | % | 58.3 |
| Air Permeability | D737 | 4 | ft³/min/ft² | 43.6 |

Example 9

Three small specimens of a polypropylene melt blown fabric that were 2 inches wide and 2 inches long were cut and weighed. This product is commercially available from SpillTech in Mobile, Ala. as Style GPA100H. The basis weight of the specimens is listed in Table 15 along with the dry weight of the specimen. They were then soaked in oil with a viscosity of 320 centistokes. The 320 centistoke oil that was used is commercially available as Mobil® Spartan® EP320 Gear Lube Oil. The weight of each specimen was measured after they were allowed to soak in oil. Table 15 shows the results of the measurements. The average number of times in dry weight of 320 centistoke oil absorbed by the three specimens was 10.9. Grab tensile properties, air permeability, basis weight using, thickness and burst strength were measured on this fabric. The results and test methods of these measurements are shown in Table 16.

TABLE 15

Oil absorbed by polypropylene melt blown fabric GPF100H

| Specimen | Dry Weight (g) | Basis Weight (osy) | Mass of 320 centistoke oil absorbed by specimen (g) | Calculated number of times dry weight oil of 320 centistokes absorbed by specimen |
|---|---|---|---|---|
| 1 | .6350 | 7.257 | 7.32 | 11.5 |
| 2 | .6622 | 7.109 | 5.80 | 8.8 |
| 3 | .7504 | 8.576 | 7.20 | 9.6 |

TABLE 16

Physical properties of polypropylene melt blown fabric GPF100H

| Property | ASTM | Sample Size | Units | Value |
|---|---|---|---|---|
| Basis Weight | D3776 | 4 | osy | 9.54 |
| Thickness | D1777 | 4 | inches | 0.0130 |
| Machine Direction Grab Strength | D5034 | 2 | pounds force | 27.3 |
| Machine Direction Grab Elongation | D5034 | 2 | % | 85.8 |
| Cross Direction Grab Strength | D5034 | 2 | pounds force | 12.6 |
| Cross Direction Grab Elongation | D5034 | 2 | % | 108.0 |
| Air Permeability | D737 | 4 | ft$^3$/min/ft$^2$ | 49.7 |

Example 10

Three small specimens of a polypropylene melt blown fabric that were 2 inches wide and 2 inches long were cut and weighed. This product is commercially available from SpillTech in Mobile, Ala. as Style YPF100H. The basis weight of the specimens is listed in Table 17 along with the dry weight of the specimen. They were then soaked in oil with a viscosity of 320 centistokes. The 320 centistoke oil that was used is commercially available as Mobil® Spartan® EP320 Gear Lube Oil. The weight of each specimen was measured after they were allowed to soak in oil. Table 15 shows the results of the measurements. The average number of times in dry weight of 320 centistoke oil absorbed by the three specimens was 10.9.

TABLE 17

Oil absorbed by polypropylene melt blown fabric YPF100H

| Specimen | Dry Weight (g) | Basis Weight (osy) | Mass of 320 centistoke oil absorbed by specimen (g) | Calculated number of times dry weight oil of 320 centistokes absorbed by specimen |
|---|---|---|---|---|
| 1 | 0.7325 | 8.37 | 6.619 | 9.04 |
| 2 | 0.7157 | 8.18 | 6.566 | 9.17 |
| 3 | 0.8675 | 9.91 | 6.771 | 7.81 |

Example 11

An article was made with two outer layers of 0.3 osy nylon spunbond and 5 osy polyester batting in between the two layers. The 0.3 osy nylon spunbond fabric is commercially available from Cerex Advanced Fabrics in Cantonment, Fla. under the tradenames OIL SHARK® or PBN-II® as style SK030. The polyester batting was made from recycled polyester bottles. The amount of recycled material in this article is about 89%. The layers are stitched on the longitudinal edge and then six inches from each edge at about 6 inches from one edge and 12 inches from this same edge. Three small specimens that were 2 inches wide and 2 inches long were cut and weighed. They were then soaked in oil with a viscosity of 320 centistokes. The 320 centistoke oil that was used is commercially available as Mobil® Spartan® EP320 Gear Lube Oil. The weight of each specimen was measured after they were allowed to soak in oil. Table 18 shows the results of the measurements. The average number of times in dry weight of 320 centistoke oil absorbed by the three specimens was 40.35.

Grab tensile properties of this article with one and two longitudinal seams was measured. Air permeability, basis weight and thickness were also measured. The results of these measurements are shown in Table 19.

TABLE 18

Oil absorbed by article made with 5 osy polyester batting sandwiched in between two layers of 0.3 osy spunbond nylon fabrics

| Specimen | Dry Weight (g) | Basis Weight (osy) | Mass of 320 centistoke oil absorbed by specimen (g) | Calculated number of times dry weight oil of 320 centistokes absorbed by specimen |
|---|---|---|---|---|
| 1 | 0.5081 | 5.806 | 18.304 | 36.02 |
| 2 | 0.4724 | 5.398 | 18.965 | 40.15 |
| 3 | 0.5111 | 5.840 | 22.936 | 44.88 |

TABLE 19

Physical properties of polypropylene melt blown fabric GPF100H

| Property | ASTM | Sample Size | Units | Value |
|---|---|---|---|---|
| Basis Weight | D3776 | 4 | osy | 5.485 |
| Thickness | caliper | 3 | inches | 0.644 |
| Machine Direction Grab Strength 1 seam | D5034 | 1 | pounds force | 13.5 |
| Machine Direction Grab Elongation 1 seam | D5034 | 1 | % | 34.36 |
| Cross Direction Grab Strength 1 seam | D5034 | 1 | pounds force | 9.17 |
| Cross Direction Grab Elongation 1 seam | D5034 | 1 | % | 60.63 |

TABLE 19-continued

Physical properties of polypropylene melt blown fabric GPF100H

| Property | ASTM | Sample Size | Units | Value |
|---|---|---|---|---|
| Machine Direction Grab Strength 2 seams | D5034 | 1 | pounds force | 16.78 |
| Machine Direction Grab Elongation 2 seams | D5034 | 1 | % | 56.57 |
| Cross Direction Grab Strength 2 seams | D5034 | 1 | pounds force | 11.47 |
| Cross Direction Grab Elongation 2 seams | D5034 | 1 | % | 57.47 |
| Air Permeability | D737 | 4 | $ft^3/min/ft^2$ | 624 |

Example 12

An article can be made with two outer layers of 0.3 osy nylon spunbond and 3 osy polyester batting between the two layers. The 0.3 osy nylon spunbond fabric is commercially available from Cerex Advanced Fabrics in Cantonment, Fla. under the tradenames OIL SHARK® or PBN-II® as style SK030. The polyester batting can be made from recycled polyester bottles. The amount of recycled material in this article is about 89%. The layers are stitched on the longitudinal edge and then six inches from each edge at about 6 inches from one edge and 12 inches from this same edge. This article will absorb about 40 times its dry weight in oil that has a viscosity of 320 centistokes.

Example 13

Mean pore size was measured on several basis weights of Oil Shark fabric Type SK. This fabric is commercially available from Cerex Advanced Fabrics in Cantonment, Fla. The results are shown in Table 20.

TABLE 20

Mean pore size of Oil Shark ® fabrics for the average of 2 specimens

| OIL SHARK ® Product Style | Type SK Basis Weight | Mean Pore Size (microns) |
|---|---|---|
| SK030 | 0.30 | 86.7 |
| SK040 | 0.40 | 128.9 |
| SK050 | 0.50 | 120.7 |
| SK060 | 0.60 | 83.9 |
| SK070 | 0.70 | 83.5 |
| SK085 | 0.85 | 62.3 |
| SK100 | 1.00 | 57.4 |
| SK150 | 1.50 | 43.8 |
| SK200 | 2.00 | 43.1 |
| SK240 | 2.40 | 40.2 |
| SK300 | 3.00 | 34.1 |
| SK400 | 4.00 | 31.0 |

Example 14

A glass baking dish was filled with about one liter of tap water. The dimensions of the dish were 8 inches by 11.5 inches by 2 inches deep. One drop of gasoline was placed in the water creating a multi colored sheen on top of the water. Oil Shark® 1 osy fabric was used to remove all the sheen. This was repeated two more times and the sheen was removed in both the repetitions.

Example 15

A glass baking dish was filled with about one liter of tap water. The dimensions of the dish were 8 inches by 11.5 inches by 2 inches deep. One drop of gasoline was placed in the water creating a multi colored sheen on top of the water. A polyester 1 osy fabric was used to remove all the sheen. This was repeated two more times and the sheen was removed in both the repetitions.

Example 16

A glass baking dish was filled with about one liter of tap water. The dimensions of the dish were 8 inches by 11.5 inches by 2 inches deep. A 4 inch by 4 inch piece of nylon Oil Shark® fabric was placed on top of the water with a 1 inch by 2 inch piece of writing paper on top of the Oil Shark® fabric. The paper became wet in about 23 seconds. Similarly, a 4 inch by 4 inch piece of polyester spunbond was placed on top of the water with a 1 inch by 2 inch piece of note paper on top of the polyester fabric. The paper never became wet. This is because of the hydrophobicity of polyester as previously described above. Only the side of the polyester fabric will be available to remove oil sheen whereas both sides of the nylon fabric will be available to remove oil sheen since the nylon fabric wets out in water and the polyester fabric will not. All hydrophobic materials will behave this way. The hydrophilic nature of nylon provides an advantage to removing oil sheen on water.

Example 17

Pads that were 15 inches wide and 16 inches long were made with two outer layers of 0.7 osy nylon spunbond and an inner layer of 3 osy polyester batting made up of two types of polyester, one being a low melt polyester. The 0.7 osy nylon spunbond fabric is commercially available from Cerex Advanced Fabrics in Cantonment, Fla. under the tradenames OIL SHARK® or PBN-II® as style SK070. The polyester batting was made from recycled polyester bottles. The amount of recycled material in this article is about 61%. The layers were stitched together in a stitch bonding machine using a sinusoidal pattern that was approximately 3.5 inches apart. Some of the pads were seamed on all four perimeter edges using a surged seam. Three specimens were tested for oil absorption using oil that has a viscosity of 320 centistokes. The average absorption of the three specimens was 69.2 times its dry weight.

Example 18

Pads that were 15 inches wide and 16 inches long were made with two outer layers of 0.85 osy nylon spunbond and an inner layer of 3 osy polyester batting made up of two types of polyester, one being a low melt polyester. The 0.85 osy nylon spunbond fabric is commercially available from Cerex Advanced Fabrics in Cantonment, Fla. under the tradenames OIL SHARK® or PBN-II® as style SK085. The polyester batting was made from recycled polyester bottles. The amount of recycled material in this article is about 57%. The layers were stitched together in a stitch bonding machine using a sinusoidal pattern that was approximately 3.5 inches apart. Some of the pads were seamed on all four perimeter edges using a surged seam. Three specimens were tested for oil absorption using oil that has a viscosity of 320 centistokes. The average absorption of the three specimens was 42.7 times its dry weight.

Example 19

Pads that were 15 inches wide and 16 inches long were made with two outer layers of 1.0 osy nylon spunbond and an inner layer of 3 osy polyester batting made up of two types of polyester, one being a low melt polyester. The 1.0 osy nylon spunbond fabric is commercially available from Cerex Advanced Fabrics in Cantonment, Fla. under the tradenames OIL SHARK® or PBN-II® as style SK010. The polyester batting was made from recycled polyester bottles. The amount of recycled material in this article is about 54%. The layers were stitched together in a stitch bonding machine using a sinusoidal pattern that was approximately 3.5 inches apart. Some of the pads were seamed on all four perimeter edges using a surged seam. Three specimens were tested for oil absorption using oil that has a viscosity of 320 centistokes. The average absorption of the three specimens was 38.9 times its dry weight.

It should be understood that the examples and embodiments described herein are for illustrative purposes only and that various modifications or changes in light thereof will be suggested to persons skilled in the art and are to be included within the spirit and purview of this application and the scope of the appended claims.

All patents, patent applications, provisional applications, and publications referred to or cited herein are incorporated by reference in their entirety, including all figures and tables, to the extent they are not inconsistent with the explicit teachings of this specification.

What is claimed is:

1. An article for removal of oil sheen from water, comprising:
    a fabric that removes oil sheen from the surface of water,
    wherein the fabric comprises at least one of nylon, polyester, and polypropylene,
    wherein the fabric has a machine direction grab tensile strength of at least 3 pounds force ($lb_f$) as measured by ASTM D5034,
    wherein the fabric has a basis weight of at least 0.1 ounce per square yard (osy),
    wherein the article further comprises a plurality of pom poms attached to each other, and
    wherein each pom pom weighs at least 0.05 pounds and comprises strips of the fabric.

2. The article according to claim 1, wherein the fabric is capable of absorbing at least 3 times its dry weight in crude oil.

3. The article according to claim 1, wherein the fabric is capable of absorbing at least 10 times its dry weight in crude oil.

4. The article according to claim 1, wherein the fabric is capable of absorbing at least 15 times its dry weight in oil that has a viscosity of 320 centiStokes.

5. The article according to claim 1, wherein the fabric is capable of absorbing at least 7.8 times its dry weight in oil that has a viscosity of 320 centiStokes.

6. The article according to claim 1, wherein the fabric passes the criteria for SW-846, Third Edition.

7. The article according to claim 1, wherein the fabric has a thickness of at least 2 mil.

8. The article according to claim 1, wherein the fabric has a machine direction grab tensile strength of at least 6.2 $lb_f$ as measured by ASTM D5034.

9. The article according to claim 1, wherein the fabric passes the criteria for NSF/ANSI Standard 61-2007a.

10. The article according to claim 1, wherein the fabric is a nylon spunbond fabric.

11. The article according to claim 1, wherein the fabric comprises fibers made of recycled materials.

12. The article according to claim 1, wherein the fabric comprises continuous filaments.

13. The article according to claim 1, wherein the fabric is dyed.

14. The article according to claim 1, wherein the fabric is oleophilic and hydrophilic.

15. The article according to claim 1, wherein the fabric is capable of absorbing at least 3 times its dry weight in crude oil,
    wherein the fabric passes the criteria for SW-846, Third Edition, and
    wherein the fabric has a thickness of at least 2 mil.

16. A method of removing oil sheen from water, comprising:
    deploying the article according to claim 15; and
    using the article to remove oil sheen from water.

17. The article according to claim 1, comprising at least two layers of the fabric, wherein at least one of the layers of the fabric has a basis weight of at least 0.25 osy.

18. The article according to claim 17, wherein the fabric is capable of absorbing at least 7.8 times its dry weight in oil that has a viscosity of 320 centiStokes,
    wherein the fabric passes the criteria for SW-846, Third Edition, and
    wherein the fabric has a machine direction grab tensile strength of at least 6.2 $lb_f$ as measured by ASTM D5034.

19. A method of removing oil sheen from water, comprising:
    deploying the article according to claim 18; and
    using the article to remove oil sheen from water.

20. A method of removing oil sheen from water, comprising:
    deploying the article according to claim 1; and
    using the article to remove oil sheen from water.

* * * * *